United States Patent
Wu

(10) Patent No.: US 9,532,202 B2
(45) Date of Patent: *Dec. 27, 2016

(54) ACCESS CONTROL METHOD, ACCESS CONTROL APPARATUS AND COMMUNICATION SYSTEM

(71) Applicant: Huawei Technologies Co., Ltd., Shenzhen, Guangdong (CN)

(72) Inventor: Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,225

(22) Filed: Mar. 16, 2015

(65) Prior Publication Data
US 2015/0195697 A1    Jul. 9, 2015

Related U.S. Application Data

(63) Continuation of application No. 13/091,367, filed on Apr. 21, 2011, now Pat. No. 9,001,785, which is a
(Continued)

(30) Foreign Application Priority Data

Oct. 21, 2008  (CN) .......................... 2008 1 0171569
Mar. 24, 2009  (CN) .......................... 2009 1 0119370
May 5, 2009    (CN) .......................... 2009 1 0139153

(51) Int. Cl.
H04W 4/00    (2009.01)
H04M 1/66    (2006.01)
(Continued)

(52) U.S. Cl.
CPC .............. *H04W 4/22* (2013.01); *H04W 12/08* (2013.01); *H04W 36/0088* (2013.01); *H04W 48/04* (2013.01); *H04W 76/007* (2013.01)

(58) Field of Classification Search
CPC ...... H04W 48/02; H04W 48/10; H04W 48/16; H04W 84/045; H04L 63/101
(Continued)

(56) References Cited

U.S. PATENT DOCUMENTS 8,019,331 B2   9/2011   Khetawat et al.
8,027,687 B2   9/2011   Jung et al.
(Continued)

FOREIGN PATENT DOCUMENTS

CN    1604502 A    4/2005
CN    1909576 A    2/2007
(Continued)

OTHER PUBLICATIONS

3rd Generation Partnership Project; Technical Specification Group Services and System Aspects; General Packet Radio Services (GPRS) enhancements for Evolved Universal Terrestrial Radio Access Network (E-UTRAN) access (Release 8), 3GPP TS 23.401 v8.3.0, Sep. 2008, 204 pages.
(Continued)

*Primary Examiner* — Man Phan
*Assistant Examiner* — Ryan Kavleski

(57) ABSTRACT

An access control method, an access control apparatus and a communication system are disclosed, and a mechanism for processing Emergency Call (EMC) services is disclosed, and such mechanism ensures continuity of the EMC service while implementing the access control under a Closed Subscriber Group (CSG) mechanism. The access control method includes: obtaining CSG area information of a target area; and controlling the access of a User Equipment (UE) to the target area according to the CSG area information of the target area and/or whether an EMC service exists on the
(Continued)

UE. The present invention is applicable to the scenario in which the UE accesses a network.

8 Claims, 13 Drawing Sheets

Related U.S. Application Data continuation of application No. PCT/CN2009/074469, filed on Oct. 15, 2009.

(51) Int. Cl.

| | | |
|---|---|---|
| *H04W 4/22* | (2009.01) | |
| *H04W 48/04* | (2009.01) | |
| *H04W 12/08* | (2009.01) | |
| *H04W 36/00* | (2009.01) | |
| *H04W 76/00* | (2009.01) | |

(58) Field of Classification Search
USPC .......................................... 370/331, 339, 461
See application file for complete search history.

(56) References Cited

U.S. PATENT DOCUMENTS

| 8,041,335 B2* | 10/2011 | Khetawat et al. ......... 455/404.2 |
|---|---|---|
| 8,345,635 B2* | 1/2013 | Wu .......................... H04W 4/22 |
| | | 370/331 |
| 2005/0075121 A1 | 4/2005 | Hasegawa |
| 2005/0101288 A1* | 5/2005 | Hulkkonen et al. ....... 455/404.1 |
| 2007/0274462 A1 | 11/2007 | Wu |
| 2008/0132239 A1 | 6/2008 | Khetawat et al. |
| 2008/0207170 A1 | 8/2008 | Khetawat et al. |
| 2008/0267153 A1* | 10/2008 | Mukherjee et al. .......... 370/338 |
| 2009/0047960 A1 | 2/2009 | Gunnarsson et al. |
| 2009/0270092 A1* | 10/2009 | Buckley et al. .............. 455/434 |
| 2010/0008259 A1* | 1/2010 | Yoon et al. ................... 370/254 |
| 2010/0157850 A1* | 6/2010 | Horn et al. ................... 370/259 |
| 2010/0279687 A1* | 11/2010 | Horn et al. ................. 455/435.1 |
| 2011/0116477 A1 | 5/2011 | Wu |
| 2011/0165878 A1* | 7/2011 | Nylander ............. H04J 11/0069 |
| | | 455/436 |
| 2011/0269468 A1* | 11/2011 | Sundell ................. H04W 36/26 |
| | | 455/436 |
| 2012/0270546 A1* | 10/2012 | Yoon et al. ................. 455/435.1 |

FOREIGN PATENT DOCUMENTS

| CN | 101166364 A | 4/2008 |
|---|---|---|
| CN | 101287294 A | 10/2008 |
| EP | 2 117 252 A1 | 11/2009 |
| GB | 2 447 569 A | 9/2008 |
| JP | 2003348145 A | 12/2003 |
| WO | WO 2008/081816 A1 | 7/2008 |

OTHER PUBLICATIONS

"Universal Mobile Telecommunications System (UMTS); Mobility Procedures for Home Node B; Overall description; Stage 2 (3GPP TS 25.367 version 8.0.0 Release 8)", ETSI TS 125 367 v8.0,0, Jan. 2009, 13 pages.

"3rd Generation Partnership Project (3GPP); Technical Specification Group (TSG) RAN; Working Group 2 (WG2); RRC Protocol Specification", TS 25.331 v3.0.0, Oct. 1999, 257 pages.

"Allowed CSG List handling", 3GPP TSG CT WG1 Meeting #55bis, Phoenix, Arizona, Oct. 6-10, 2008, 4 pages.

* cited by examiner

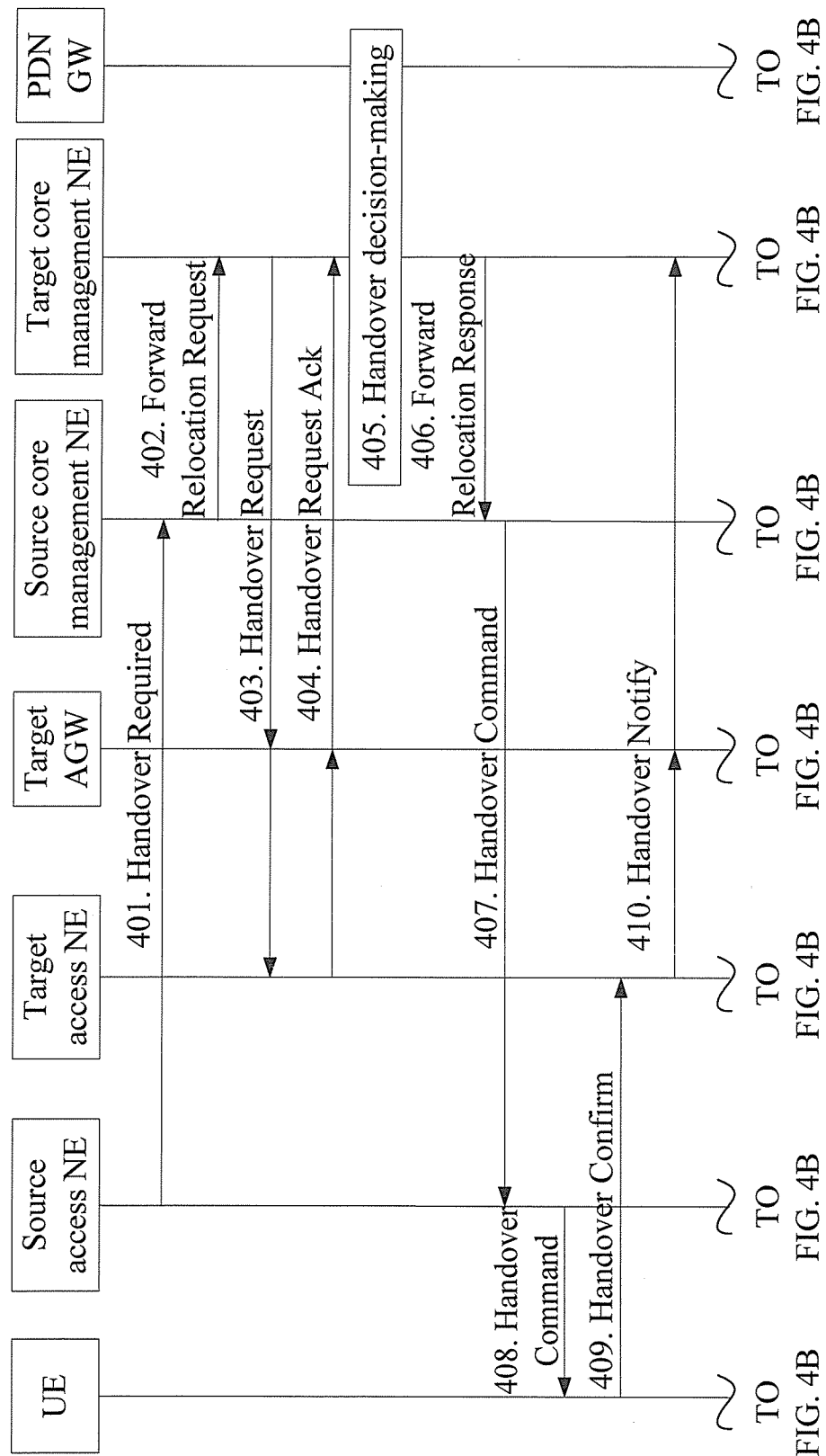

ACCESS CONTROL METHOD, ACCESS CONTROL APPARATUS AND COMMUNICATION SYSTEM

CROSS-REFERENCE TO RELATED APPLICATIONS

This application is a continuation of U.S. patent application Ser. No. 13/091,367 filed on Apr. 21, 2011, which is a continuation of International Application No. PCT/CN2009/074469, filed on Oct. 15, 2009. The International Application claims priority to Chinese Patent Application No. 200810171569.9, filed on Oct. 21, 2008 and Chinese Patent Application No. 200910119370.6, filed on Mar. 24, 2009 and Chinese Patent Application No. 200910139153.3, filed on May 5, 2009 all of which are hereby incorporated by reference in their entireties.

TECHNICAL FIELD

The present invention relates to communication network technologies, and in particular, to an access control method, an access control apparatus, and a communication system.

BACKGROUND

With fast development of network technologies, the Internet access technology is evolving. The home access mode is a new access mode currently being researched by the 3rd Generation Partnership Project (3GPP) and non-3GPP standardization organizations.

In home access mode, a User Equipment (UE) accesses a mobile network through a universal Internet Protocol (IP) access network by using a home Wireless Access Point (WAP) and the licensed spectrum. The licensed spectrum may be the spectrum used in various networks, for example, the UMTS Terrestrial Radio Access Network (UTRAN), Evolved UTRAN (E-UTRAN), Code Division Multiple Access (CDMA) network, Worldwide Interoperability for Microwave Access (WiMAX) network, Wireless Local Area Network (WLAN), and High Rate Packet Data (HRPD) network. A home WAP is also known as a Femtocell.

A Closed Subscriber Group (CSG) mechanism is introduced to restrict the access of a UE to a specific home WAP. The CSG identifies some UEs (or users) authorized to access one or more cells of an operator, but restricts the access of other UEs to such cells. A CSG area includes one or more cells, which are identified by a CSG Identifier (ID). A CSG area is accessible to a group of UEs, but not accessible to other UEs than this group of UEs. The CSG IDs of all CSG areas accessible to a UE form an Allowed CSG List, which is also known as a CSG White List. The Allowed CSG List of the UE is stored in a mobility management Network Element (NE) such as a Serving GPRS Support Node (SGSN) and a Mobility Management Entity (MME), or stored in a non-3GPP Gateway (GW) or the UE.

Currently, the 3GPP standardization organization is developing an Emergency Call (EMC) service in an IP Multimedia Subsystem (IMS) to provide emergency call services such as policy emergency calls and fire emergency calls for users by using an IP-Connectivity Access Network (IP-CAN) network (such as GPRS/UMTS/E-UTRAN/WLAN/WiMAX) and the IMS system.

However, the prior art has drawbacks. For example, when a UE is handed over from a source access NE to a target access NE or a target cell, no access control is exercised; and the access control is exercised only after the UE is handed over to the target access NE or target cell. In this mechanism, the access control is exercised only after the UE is handed over to the target access NE or target cell, and consequently, the UE is not allowed to access the target access NE or target cell after the handover, and the ongoing service on the UE is terminated, which impairs the user experience.

In the CSG mechanism, when the UE is handed over from the source home WAP to the target home WAP, if the CSG ID corresponding to the target home WAP does not exist in the Allowed CSG List of the UE, the access of the UE to the target home WAP is rejected; if the UE has an EMC service at this time, the EMC service is interrupted. The prior art provides no mechanism for processing the EMC service in this circumstance.

SUMMARY

To prevent interruption of an EMC service when a UE accesses a target access NE, embodiments of the present invention provide an access control method, an access control apparatus, and a communication system, and provide a mechanism for processing the EMC service. Such mechanism ensures continuity of an EMC service while access control under a CSG mechanism is implemented.

To achieve such objectives, embodiments of the present invention are based on the following technical solution:

An access control method includes:
obtaining CSG area information of a target area; and
controlling the access of a UE to the target area according to the CSG area information of the target area and/or whether an EMC service exists on the UE.

An access control apparatus includes:
an obtaining unit, configured to obtain a CSG ID of a target area and an Allowed CSG List of a UE; and
an access control unit, configured to control the access of the UE to the target area according to whether the CSG ID of the target area exists in the Allowed CSG List of the UE and/or whether an EMC service exists on the UE.

An access control apparatus includes:
an obtaining unit, configured to obtain that a target area is a CSG area and that no Allowed CSG List of a UE exists; and an access control unit, configured to control the access of the UE to the target area according to the facts that the target area is a CSG area and that no Allowed CSG List of the UE exists and/or according to whether an EMC service exists on the UE.

A communication system includes a target access NE and a target core management NE.

The target access NE is configured to access a UE.

The target core management NE is configured to obtain a CSG ID of a target area and an Allowed CSG List of the UE, and control the access of the UE to the target area according to whether the CSG ID of the target area exists in the Allowed CSG List of the UE and/or whether an EMC service exists on the UE, or control the access of the UE to the target area according to the facts that the target area is a CSG area and that no Allowed CSG List of the UE exists and/or according to whether an EMC service exists on the UE.

A communication system includes a source access NE and a target access NE.

The source access NE is configured to obtain a CSG ID of a target area and an Allowed CSG List of a UE, and select the target area to initiate a handover procedure if an EMC service exists on the UE and/or the CSG ID of the target area exists in the Allowed CSG List of the UE; or configured to obtain that the target area is a CSG area and that no Allowed CSG List of the UE exists, and select the target area to initiate a handover procedure if an EMC service exists on the UE.

The target access NE is configured to access the UE.

A communication system includes a target access NE and a source core management NE.

The source core management NE is configured to allow a UE to access a target area if an EMC service exists on the UE and/or a CSG ID of the target area exists in an Allowed CSG List of the UE; or configured to obtain that the target area is a CSG area and that no Allowed CSG List of the UE exists, and allow the UE to access the target area if an EMC service exists on the UE.

The target access NE is configured to access the UE.

A communication system includes:

a target access NE, configured to obtain a CSG ID of a target area and an Allowed CSG List of a UE, and control the access of the UE to the target area according to whether the CSG ID of the target area exists in the Allowed CSG List of the UE and/or whether an EMC service exists on the UE; or configured to obtain that the target area is a CSG area and that no Allowed CSG List of the UE exists, and control the access of the UE to the target area according to the facts that the target area is a CSG area and that no Allowed CSG List of the UE exists and/or according to whether an EMC service exists on the UE.

BRIEF DESCRIPTION OF THE DRAWINGS

FIGS. 4A and 4B show mode 2 of scenario 1 of an access control method according to the second embodiment of the present invention;

DETAILED DESCRIPTION

To make the technical solution under the present invention clearer, the following describes the embodiments of the present invention with reference to the accompanying drawings. Apparently, the embodiments provided below are not exhaustive, and persons of ordinary skill in the art can derive other embodiments of the present invention from such embodiments without creative efforts.

Figure 1:
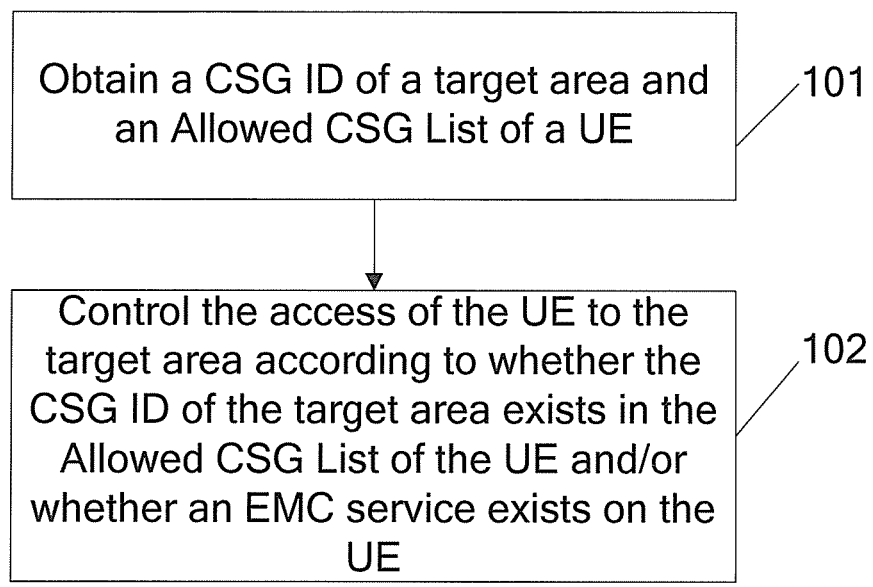
FIG. 1 shows an access control method applied during handover in a first embodiment of the present invention.

As shown in FIG. 1, an access control method provided in the first embodiment of the present invention includes:

Step 101: Obtain a CSG ID of a target access NE and an Allowed CSG List of a UE.

Step 102: Control the access of the UE to the target access NE according to whether the CSG ID of the target access NE exists in the Allowed CSG List of the UE and/or whether an EMC service exists on the UE.

"Obtain the CSG ID of the target access NE and the Allowed CSG List of the UE" herein refers to "learn the CSG ID of the target access NE and the Allowed CSG List of the UE", namely, a word "learn" is equivalent to "obtain" in the description herein, the same hereinafter.

Note: The CSG ID of the target access NE mentioned here is a type of CSG ID of a target area. CSG ID information may be a CSG ID in other target areas such as a target cell, a target tracking area, or a target routing area. That is, the target area mentioned herein includes the target access NE, target cell, target tracking area, and target routing area. For ease of description, the CSG ID of the target access NE is taken as an example in all embodiments provided herein. However, the technical solution under the present invention is also applicable to the scenarios of other target areas.

Note: If no Allowed CSG List of the UE exists, step 101 is: obtain that the target area is a CSG area and that no Allowed CSG List of the UE exists; and step 102 is: control the access of the UE to the target area according to the facts that the target area is a CSG area and that no Allowed CSG List of the UE exists and/or according to whether an EMC service exists on the UE.

The technical solution provided in the first embodiment uses whether an EMC service exists on the UE as a factor for access control, and provides a mechanism for processing the EMC service during handover under a CSG mechanism; during handover, the mechanism for processing the EMC service provided in this embodiment exercises access control on the UE without interrupting the EMC service of the UE, thus ensuring continuity of the EMC service.

In this embodiment, the handover scenario is taken as an example for describing the technical solution. The handover mentioned in this embodiment refers to handover of the UE from a source access NE to a target access NE. Such handover may occur in the same location area or between different location areas, or occur in other scenarios, for example, the access of a UE to a new cell when the UE initiates a location update procedure, the same hereinafter.

The following describes an access control method in a handover scenario in the second embodiment of the present invention. The method is applied in at least the following scenarios:

Scenario 1:

The core management NE of the target network implements access control during handover.

Depending on the network topology and the handover procedure, scenario 1 includes two modes.

Figure 3A:
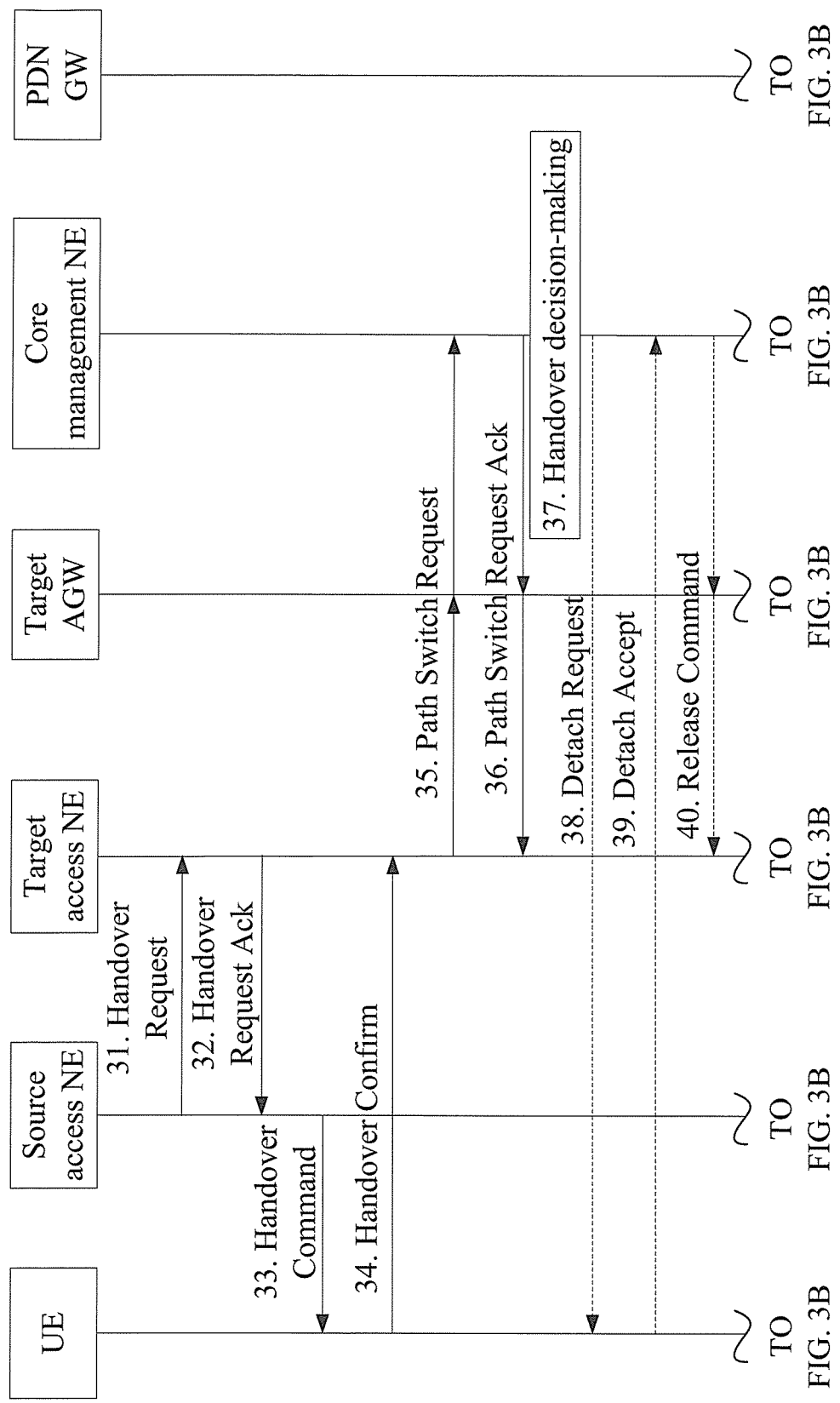
FIGS. 3A and 3B show mode 1 of scenario 1 of an access control method according to a second embodiment of the present invention.
Figure 3B:
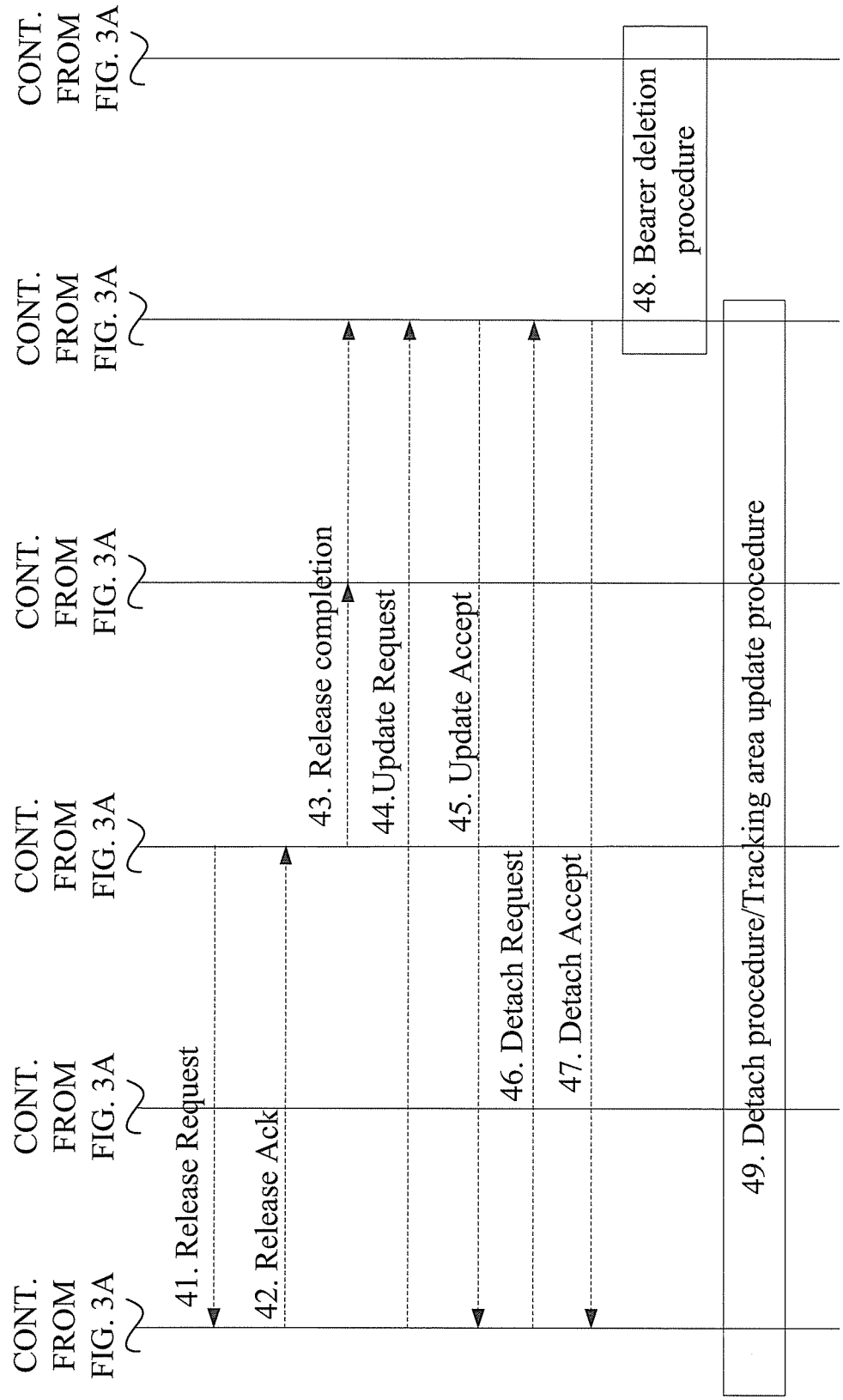

Mode 1:

FIGS. 3A and 3B illustrate the network structure and the method procedure of mode 1. The procedure includes the following steps:

Step 31: The source access NE makes a handover decision, that is, decides to hand over the UE to a target access NE. The source access NE sends a Handover Request message to the target access NE.

The target access NE may be a home WAP (such as a Home NodeB which is HNB for short) or a Home evolved NodeB which is HeNB for short or a Home non-3GPP WAP) in home access system architecture, or a WAP with CSG functions (for example, a NodeB, or an eNodeB, or a non-3GPP WAP).

Figure 2:
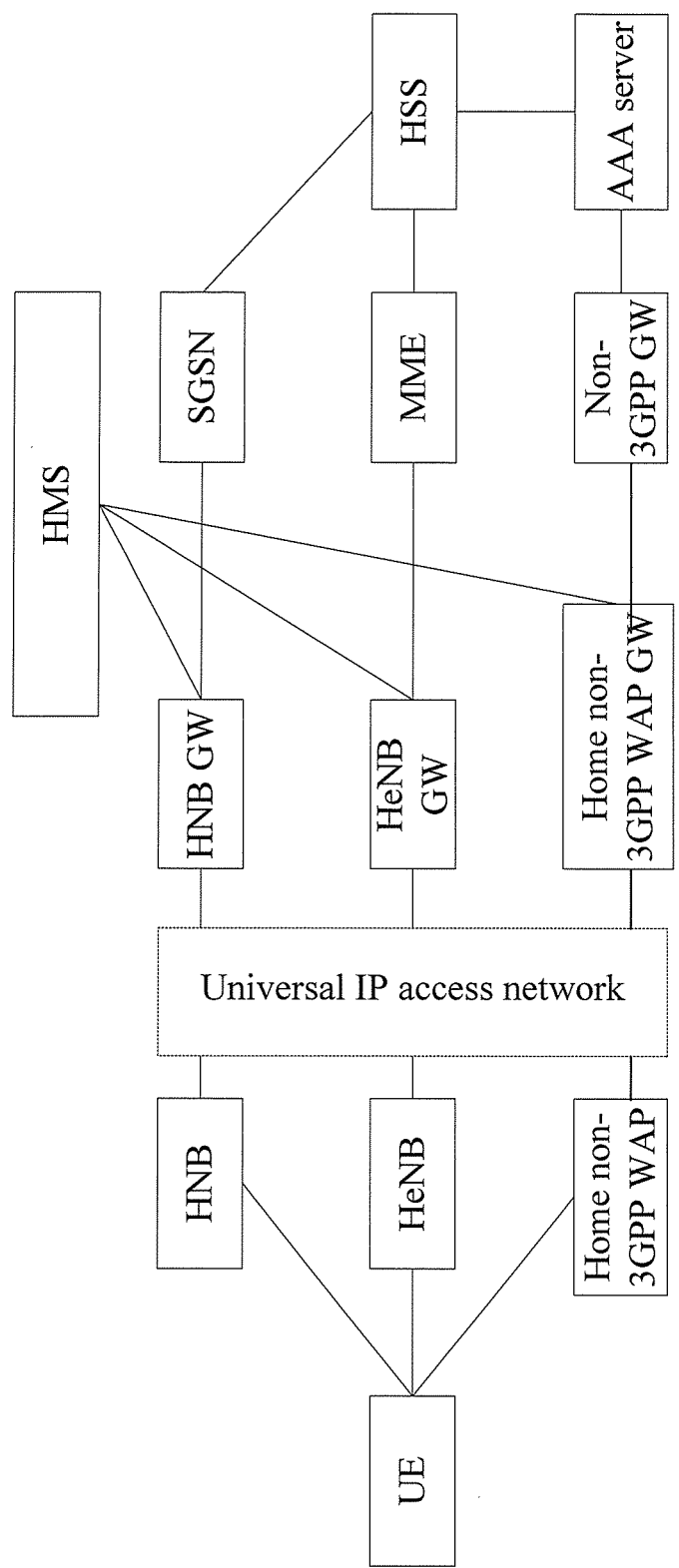
FIG. 2 shows an architecture of a home access system.

To make the technical solution under the present invention clearer, FIG. 2 illustrates home access system architecture. In this architecture, the HNB is a home WAP that runs on the UTRAN spectrum; the HeNB is a home WAP that runs on the E-UTRAN spectrum; and the home non-3GPP WAP is a home WAP that runs on the spectrum of a non-3GPP network such as a CDMA/WiMAX/WLAN/HRPD network.

The HNB GW, the HeNB GW, and the home non-3GPP WAP GW are home WAP GWs connected to the HNB, HeNB, and home non-3GPP WAP respectively through a universal IP access network.

The home WAP GW has the functions such as performing management and access control for the home WAPs, aggregating the home WAPs, and routing and forwarding signaling data between an NE in the mobile network and the home WAP.

NEs in a mobile network include: MME in an E-UTRAN, SGSN in a GPRS/UMTS, and non-3GPP GWs (also known as Mobile Access Gateways which is MAGs for short) in a non-3GPP network. Examples of non-3GPP GWs are: Evolved Packet Data Gateway (EPDG) in a WLAN network, Access Service Network Gateway (ASN GW) in a WiMAX network, Access Gateway (AGW) in a CDMA network, and HRPD Serving Gateway (HSGW) in an HRPD network.

A Home Subscriber Server (HSS) is configured to store subscription information of a UE. An Authentication, Authorization and Accounting (AAA) server is configured to perform access authentication, authorization, and charging of the UE.

A Home Management Server (HMS) is responsible for managing home WAPs. The HMS may be stand-alone or integrated in another NE such as the HSS. The HMS may be connected to a gateway of a home Access Point (AP), or directly connected to a home WAP. FIG. 1 illustrates the connection relation between the HMS and the gateway of the home AP.

Moreover, what is provided above is only an example of the home access system architecture. In another home access system architecture, the home AP may be connected to an NE in the mobile network directly.

The core management NEs mentioned in this embodiment include the SGSN, MME, and non-3GPP GW.

Step 32: The target access NE returns a Handover Request Ack message to the source access NE.

Step 33: The source access NE sends a Handover Command message to the UE, instructing the UE to be handed over to the target access NE.

Step 34: The UE is handed over to the target access NE, and sends a Handover Confirm message to the target access NE.

Step 35: The target access NE sends a Path Switch Request message to the core management NE. Alternatively, the target access NE adds the CSG ID of the target access NE to the Path Switch Request message.

When a target AGW exists in the network, the Path Switch Request message is sent to the core management NE through the target AGW. FIGS. 3A and 3B illustrate the scenario in which a target AGW exists.

Step 36: The core management NE returns a Path Switch Request Ack message to the target access NE.

Step 37: The core management NE makes a handover decision. This step includes:

Step 371: The core management NE of the target network obtains the CSG ID of the target access NE and the Allowed CSG List of the UE.

The core management NE obtains the Allowed CSG List of the UE from the HSS. For example, the core management NE sends an Update Location message to the HSS, and the HSS returns an Update Location Ack message that carries the Allowed CSG List of the UE to the core management NE.

Note: If the subscription information of the UE includes no Allowed CSG List, the UE subscription information obtained by the core management NE from the HSS includes no Allowed CSG List of the UE (namely, the core management NE has no Allowed CSG List of the UE).

The core management NE may obtain the CSG ID of the target access NE in at least one of the following ways:

(1) Receive a Path Switch Request message from the target access NE, where the Path Switch Request message carries the CSG ID of the target access NE.

(2) Search a table of mapping relations between an ID of the target access NE and the CSG ID, and obtain the CSG ID of the target access NE according to the ID of the target access NE, where the table of mapping relations between an ID of the target access NE and the CSG ID is configured in the core management NE.

(3) Search the table of mapping relations between an ID of the target access NE and the CSG ID, and obtain the CSG ID of the target access NE according to the ID of the target access NE, where the table of mapping relations between an ID of the target access NE and the CSG ID is configured in an HMS or a Backend Administration Module (BAM) system of the operator such as the Operation Support System (OSS), Business and Operation Support System (BOSS), Operation and Maintenance Center (OMC).

Note: The BAM system of the operator may be named "management platform" of the operator. The names herein shall not be constructed as limitations to the present invention.

(4) Obtain the CSG ID of the target access NE according to the cell ID of the target access NE, where the cell ID includes the CSG ID of the target access NE, and is reported to the core management NE of the target network through a Path Switch Request message.

Step 372: The core management NE of the target network controls the access of the UE to the target access NE according to whether the CSG ID of the target access NE exists in the Allowed CSG List of the UE and/or whether an EMC service exists on the UE.

The core management NE judges whether the CSG ID of the target access NE exists in the Allowed CSG List of the UE in at least one of the following ways:

(1) The core management NE checks whether the CSG ID of the target access NE exists in the Allowed CSG List of the UE (namely, whether the Allowed CSG List includes the CSG ID) according to the obtained CSG ID.

(2) The core management NE obtains the cell ID of the target access NE, and checks whether the CSG ID of the target access NE exists in the Allowed CSG List of the UE according to a maximum principle. For example, in the Allowed CSG List, a CSG ID is composed of 20 bits. The core management NE checks whether the 20 bits (generally, the first 20 bits) of the CSG ID in the cell ID of the target access NE are the same as the CSG ID, and, if so, determines that the CSG ID of the target access NE exists in the Allowed CSG List of the UE.

The core management NE judges whether an EMC service exists on the UE by using any of the following methods:

(1) The core management NE queries the Access Point Name (APN) used by the bearer of the UE. If discovering a specific APN (such as an emergency APN), the core management NE determines that an EMC service exists on the UE.

(2) The core management NE judges whether an emergency indication exists in the bearer of the UE, and, if an emergency indication exists in the bearer of the UE, determines that an EMC service exists on the UE.

(3) The core management NE judges the Allocation and Retention Priority (ARP) used by the bearer of the UE. If discovering a specific ARP (such as an emergency ARP), the core management NE determines that an EMC service exists on the UE.

(4) The core management NE judges the Quality of Service Class Identifier (QCI) used by the bearer of the UE. If discovering a specific QCI (such as an emergency QCI), the core management NE determines that an EMC service exists on the UE.

The core management NE controls the access of the UE to the target access NE in the following way:

allow the UE to access the target access NE if an EMC service exists on the UE; or allow the UE to access the target access NE if the CSG ID of the target access NE exists in the Allowed CSG List of the UE; or reject the access of the UE to the target access NE if at least one of the foregoing conditions is not fulfilled.

The core management NE performs control according to the two conditions above in many ways, and it does not matter which of the two conditions above is judged first, namely, the core management NE may judge whether an EMC exists on the UE first, or judge whether the CSG ID of the target access NE exists in the Allowed CSG List of the UE first.

Preferably, the core management NE in this embodiment controls the access of the UE to the target access NE in the following way:

The core management NE judges whether an EMC service exists on the UE first. If an EMC service exists on the UE, the core management NE allows the UE to access the target access NE no matter whether the CSG ID of the target access NE exists in the Allowed CSG List of the UE (that is, the core management NE does not judge whether the CSG ID of the target access NE exists in the Allowed CSG List of the UE). If no EMC service exists on the UE, the core management NE judges whether the CSG ID of the target access NE exists in the Allowed CSG List of the UE, and allows the UE to access the target access NE if the CSG ID of the target access NE exists in the Allowed CSG List of the UE, or rejects the access of the UE to the target access NE if the CSG ID of the target access NE does not exist in the Allowed CSG List of the UE.

The core management NE may judge whether the CSG ID of the target access NE exists in the Allowed CSG List of the UE first. If the CSG ID of the target access NE exists in the Allowed CSG List of the UE, the core management NE allows the UE to access the target access NE without judging whether an EMC service exists on the UE; if the CSG ID of the target access NE does not exist in the Allowed CSG List of the UE, the core management NE judges whether an EMC service exists on the UE, and allows the UE to access the target access NE if an EMC service exists, or rejects the access of the UE to the target access NE if no EMC service exists.

In mode 1 of scenario 1, if the CSG ID of the target access NE does not exist in the Allowed CSG List of the UE, and no EMC service exists on the UE, the core management NE initiates a detach procedure to detach the UE, or instructs the UE to initiate an update procedure and migrate to an accessible cell. The detach procedure or update procedure ensures that the access control mechanism for the UE during handover is consistent with the CSG mechanism.

Note: If no Allowed CSG List of the UE exists in the core management NE and the core management NE has obtained the CSG ID of the target area (or, in other words, the core management NE obtains that the target area is a CSG area, the same hereinafter), the core management NE rejects the access of the UE to the target area.

Or, if an EMC service exists on the UE, the core management NE allows the UE to access the target area; if no EMC service exists on the UE, no Allowed CSG List of the UE exists in the core management NE, and the target area is a CSG area, the core management NE rejects the access of the UE to the target area.

The UE detach procedure initiated by the core management NE includes the following steps:

Step 38: The core management NE sends a Detach Request message to the UE. The Detach Request message may carry an indication, indicating that the detach request is triggered by restricted CSG access. For example, the Detach Request message carries a cause value "CSG Not Allowed".

Step 39: The UE accepts the Detach Request, and returns a Detach Accept message to the core management NE.

If the indication carried in the Detach Request message in step 38 indicates that the detach request is triggered by restricted CSG access, the UE can select an accessible cell for accessing, for example, a non-CSG cell such as a macro cell, or an accessible CSG cell (namely, the CSG cell corresponding to a CSG ID included in the Allowed CSG List, except the CSG ID of the target access NE). This indication instructs the UE to initiate an attach procedure and register with a mobile network of the operator through the selected cell. If the Allowed CSG List of the UE includes the CSG ID of the target access NE, the UE deletes the CSG ID of the target access NE from the Allowed CSG List of the UE. The indication carried in the Detach Request message ensures that the UE accesses a target access NE that allows access, after the UE is detached from a target access NE where access is rejected.

The location update procedure initiated by the core management NE includes the following steps:

Step 40: The core management NE sends a Release Command message to the target access NE.

The Release Command message varies with different network architecture. For example, for an E-UTRAN, the MME sends a UE Context Release Command message to the access NE; for a GERAN/UTRAN, the SGSN sends an Iu Release Command message to the access NE; and, for a non-3GPP network, the non-3GPP GW sends a Resource Release Command message to the access NE.

The Release Command message carries an indication, indicating that location update needs to be initiated because the access is restricted. For example, the Release Command message carries a cause value "Access Restricted LU Required".

Step 41: The target access NE sends a Release Request message to the UE.

The Release Request message varies with different network architecture. For example, for a 3GPP network, the target access NE sends an RRC Connection Release Request message to the UE; and, for a non-3GPP network, the target access NE sends a Resource Release Request message to the UE.

The Release Request message carries an indication, indicating that location update needs to be initiated because the access is restricted. For example, the Release Request message carries a cause value "Access Restricted LU Required".

After receiving the indication, the UE selects an accessible cell, for example, a non-CSG cell such as a macro cell, or an accessible CSG cell (namely, the CSG cell corresponding to a CSG ID included in the Allowed CSG List, except the CSG ID of the target access NE), and then initiates a location update procedure.

Step 42: The UE returns a Release Ack message to the target access NE.

Step 43: The target access NE returns a Release Complete message to the core management NE.

Step 44: The UE initiates a location update procedure, and sends an Update Request message to the core management NE.

For example, for an E-UTRAN network, the UE sends a Tracking Area Update (TAU) Request message to the MME; and, for a GERAN/UTRAN network, the UE sends a Routing Area Update (RAU) Request message to the SGSN.

Step 45: The core management NE returns an Update Accept message to the UE.

At the time of updating the location area, if the UE finds that no proper cell is available for initiating a location update procedure in step 41, the procedure further includes the following steps:

Step 46: The UE initiates a detach procedure to detach the UE from the currently accessed mobile network. The UE sends a Detach Request message to the core management NE.

Step 47: The core management NE detaches the UE and returns a Detach Accept message to the UE.

Through the foregoing update procedure, after the core management NE rejects the access of the UE to the target access NE, the core management NE instructs the UE to initiate an update procedure and migrate to the target access NE that allows access, thus implementing access control under the CSG mechanism, avoiding interruption of the ongoing service of the UE, and improving the user experience.

Alternatively, if the CSG ID of the target access NE does not exist in the Allowed CSG List of the UE, but an EMC service exists on the UE, step 48 is performed: The core management NE initiates a bearer deletion procedure to delete the bearers used by non-EMC services. That is, if the CSG ID of the target access NE does not exist in the Allowed CSG List of the UE, the core management NE allows only the bearer used by the EMC service to access the target access NE, and rejects the bearer used by the non-EMC service the access to the target access NE, thus maximally ensuring that the access control mechanism applied to the UE during handover is the same as the CSG mechanism.

Note: The Packet Data Network Gateway (PGW) is a user anchor between a 3GPP access network and a non-3GPP access network, and is a gateway which terminates the interface to the Packet Data Network (PDN).

Note: If the core management NE has no Allowed CSG List of the UE, the target area is a CSG area, and an EMC service exists on the UE, the procedure includes step 48 alternatively.

Further, if the UE is allowed to access the target access NE because an EMC service exists on the UE, after completion of the EMC service of the UE, step 49 is performed:

(1) If the UE or the core management NE finds in the foregoing step that an EMC service exists on the UE and that the CSG ID of the target access NE does not exist in the Allowed CSG List of the UE, after completion of the EMC service, the UE or the core management NE initiates a detach procedure to detach the UE, or initiates a location update procedure to migrate the UE from the target access NE to the accessible cell.

Note: If the UE or the core management NE has no Allowed CSG List of the UE, the target area is a CSG area, and an EMC service exists on the UE, after completion of the EMC service, the UE or the core management NE initiates a detach procedure to detach the UE, or initiates a location update procedure to migrate the UE from the target access NE to the accessible cell (namely, the target cell, the same hereinafter).

For example, the UE or the core management NE sets an indication in the context of the UE, indicating that the UE access to the target access NE is restricted (for example, the indication is "CSG Not Allowed"). After the EMC service is terminated, the UE or the core management NE discovers the indication in the context of the UE, and therefore, initiates a detach procedure to detach the UE or initiates a location update procedure to migrate the UE from the target access NE to the accessible cell.

Or, (2) After the EMC service is terminated, the UE or the core management NE judges whether the CSG ID of the target access NE exists in the Allowed CSG List of the UE. If the CSG ID of the target access NE does not exist in the Allowed CSG List of the UE, the UE or the core management NE initiates a detach procedure to detach the UE, or initiates a location update procedure to migrate the UE from the target access NE to the accessible cell.

Note: After the EMC service is terminated, if the UE or the core management NE has no Allowed CSG List of the UE and the target area is a CSG area, the UE or the core management NE initiates a detach procedure to detach the UE or initiates a location update procedure to migrate the UE from the target access NE to the accessible cell.

Alternatively, the UE or the core management NE may start a timer. After expiry of the timer, the UE or the core management NE initiates a detach procedure to detach the UE or initiates a location update procedure to migrate the UE from the target access NE to the accessible cell.

The core management NE obtains the progress of the EMC service in many ways. For example, after receiving a bearer deletion request, which requests the core management NE to delete the bearer used by the EMC service, the core management NE believes that the EMC service of the UE is terminated.

Note: The CSG ID of the target access NE in this embodiment may be a CSG ID of another target area (such as a target cell). In this case, the processing mode is the same except that the CSG ID of the target access NE is replaced with the CSG ID of another target area.

In conclusion, the second embodiment of the present invention provides a mechanism for processing the EMC service during handover, and such mechanism ensures continuity of the EMC service while implementing the access control under the CSG mechanism.

Figure 4B:
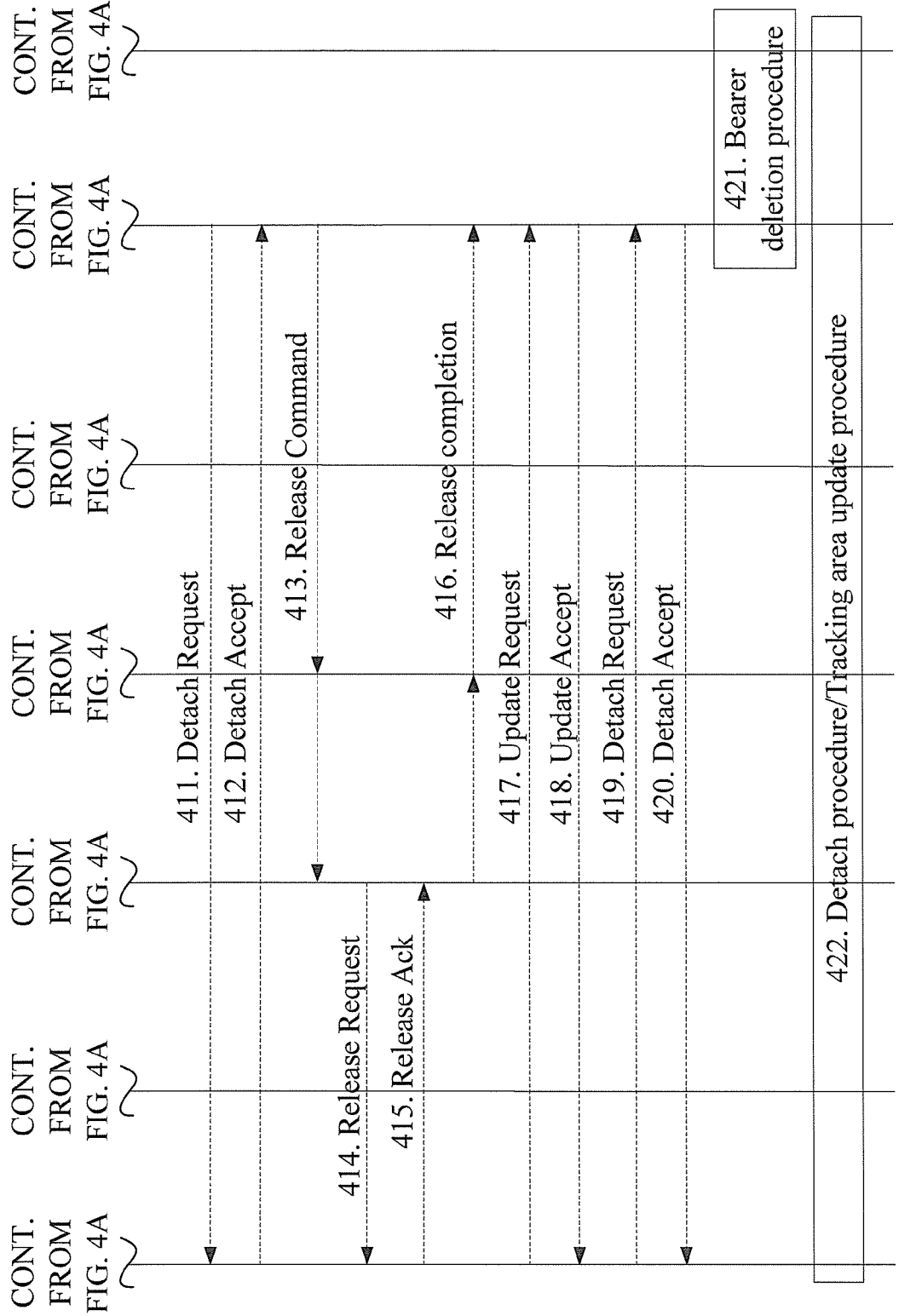

Mode 2:

FIGS. 4A and 4B illustrate the network structure and the method procedure of mode 2. The procedure includes the following steps:

Step 401: The source access NE makes a handover decision, that is, decides to hand over the UE to a target access NE. The source access NE sends a Handover Required message to the source core management NE. Alternatively, the source access NE adds the CSG ID of the target access NE to this message.

Step 402: The source core management NE sends a Forward Relocation Request message to the target core management NE. Alternatively, the source core management NE adds the CSG ID of the target access NE to this message. Alternatively, the source core management NE adds the Allowed CSG List of the UE to this message.

Step 403: The target core management NE sends a Handover Request message to the target access NE.

The target access NE may be a home WAP (such as the HNB or HeNB or Home non-3GPP WAP), or a WAP with CSG functions (for example, the NodeB, or eNodeB, or non-3GPP WAP).

Step 404: The target access NE returns a Handover Request Ack message to the target core management NE. Alternatively, the target access NE adds the CSG ID of the target access NE to this message.

When a target AGW exists in the network, the Handover Request message is sent to the core management NE through the target AGW. FIGS. 4A and 4B illustrate the scenario in which a target AGW exists.

Step 405: The target core management NE makes a handover decision. This step includes:

Step 4051: The target core management NE obtains the CSG ID of the target access NE and the Allowed CSG List of the UE.

The target core management NE may obtain the Allowed CSG List of the UE from the HSS, and may obtain the CSG ID of the target access NE in the same way as step 371 above. Moreover, in mode 2:

The target core management NE may obtain the CSG ID of the target access NE by receiving a Forward Relocation Request message from the core management NE of the source network, where the message carries the CSG ID of the target access NE.

Or the target core management NE receives a Handover Request Ack message from the target access NE, where the message carries the CSG ID of the target access NE.

Step 4052: The target core management NE controls the access of the UE to the target access NE according to whether the CSG ID of the target access NE exists in the Allowed CSG List of the UE and whether an EMC service exists on the UE.

Step 4052 is the same as step 372 above except that: In mode 1, the UE is handed over to the target access NE first; the core management NE rejects the access by only initiating a detach procedure to detach the UE or initiating a location update procedure to migrate the UE to an accessible cell; and in mode 2, the core management NE rejects the access of the UE to the target access NE by rejecting the access of the UE to the target access NE directly, or allowing the UE to access the target access NE first and then initiating a detach procedure or a location update procedure.

Alternatively, if the target core management NE obtains the CSG ID of the target access NE through step 402 above, this step may occur after step 402, namely, this step may occur after the target core management NE receives the Forward Relocation Request message from the source core management NE.

If the CSG ID of the target access NE does not exist in the Allowed CSG List of the UE and no EMC service exists on the UE, and, if the target core management NE rejects the UE handover, the target core management NE returns a Forward Relocation Response message directly which indicates handover rejection to the source core management NE, and step 403 and step 404 are omitted. The Forward Relocation Response message sent by the target core management NE carries an indication, indicating that the handover rejection is triggered by restricted CSG access. For example, the message carries a cause value "CSG Not Allowed".

Note: If no Allowed CSG List of the UE exists in the target core management NE and the target core management NE has obtained the CSG ID of the target area (or, in other words, the target core management NE obtains that the target area is a CSG area, the same hereinafter), the target core management NE rejects the access of the UE to the target area.

Or, if an EMC service exists on the UE, the core management NE allows the UE to access the target area; if no EMC service exists on the UE, no Allowed CSG List of the UE exists in the target core management NE, and the target core management NE has obtained the CSG ID of the target area (or, in other words, the target core management NE obtains that the target area is a CSG area, the same hereinafter), the target core management NE rejects the access of the UE to the target area.

Step 406: The target core management NE returns a Forward Relocation Response message to the source core management NE.

The target core management NE notifies the handover decision (namely, handover success or handover rejection) to the source core management NE through the Forward Relocation Response message.

Step 407: If the target core management NE indicates handover success, the source core management NE sends a Handover Command message to the source access NE.

If the target core management NE indicates handover rejection, the source core management NE sends a Handover Reject message to the source access NE. The Handover Reject message may carry an indication, indicating that the handover rejection is triggered by restricted CSG access. For example, the message carries a cause value "CSG Not Allowed".

Step 408: If the source access NE receives a Handover Command message, the source access NE sends the Handover Command message to the UE, instructing the UE to be handed over to the target access NE. If the Handover Reject message received by the source access NE carries an indication indicating that the handover rejection is triggered by restricted CSG access, the source access NE will not select this target access NE for initiating a handover procedure any longer subsequently.

Step 409: If the target core management NE allows the UE to access the target management NE, the UE is handed over to the target access NE, and sends a Handover Confirm message to the target access NE.

Step 410: The target access NE sends a Handover Notify message to the target core management NE, indicating that the UE has been handed over to the target access NE.

If the target core management NE allows the UE to be handed over to the target access NE first and then initiates a detach procedure, the following steps are included:

Step 411: The target core management NE sends a Detach Request message to the UE. The Detach Request message may carry an indication, indicating that the detach request is triggered by restricted CSG access. For example, the Detach Request message carries a cause value "CSG Not Allowed".

Step 412: The UE accepts the Detach Request, and returns a Detach Accept message to the target core management NE.

Step 411 and step 412 are similar to step 38 and step 39 above.

If the target core management NE allows the UE to be handed over to the target access NE first and then initiates a location update procedure, the following steps are included:

Steps 413-420: similar to steps 40-47 above.

Further, if the UE is allowed to access the target access NE because an EMC service exists on the UE, after completion of the EMC service of the UE, step 420 and step 421 are included, which are similar to step 48 and step 49 above.

Note: If the target core management NE obtains no Allowed CSG List of the UE in the handover procedure, the target core management NE performs no access control in the handover procedure. After completion of the handover, the UE initiates a location update procedure, and sends an Update Request message to the target core management NE. In the location update procedure, the target core management NE obtains the Allowed CSG List of the UE from the HSS, and then performs access control. The method of access control is the same as that described above.

In conclusion, the second embodiment of the present invention provides a mechanism for processing the EMC service, and such mechanism ensures continuity of the EMC service while implementing the access control under the CSG mechanism.

Further, the second embodiment of the present invention provides a method of access control performed when the UE moves to a new cell and initiates a location update procedure.

Note: Further, the second embodiment of the present invention provides a method of access control performed when the UE changes from an idle state to a connection state and initiates a service request procedure.

In this case, the core management NE of the target network implements access control for the UE. The access control method includes:

The core management NE of the target network allows the UE to access the target access NE if an EMC service exists on the UE.

Or the core management NE of the target network allows the UE to access the target access NE if the CSG ID of the target access NE exists in the Allowed CSG List of the UE.

Or the core management NE of the target network rejects the access of the UE to the target access NE if at least one of the foregoing conditions is not fulfilled.

The core management NE of the target network obtains the CSG ID of the target access NE and the Allowed CSG List of the UE in the same way as the method described above except for the following differences:

The core management NE of the target network is unable to obtain the CSG ID of the target access NE or the Allowed CSG List of the UE through message interactions in the handover scenario, but obtains the CSG ID of the target access NE and the Allowed CSG List of the UE through message interactions in a location update procedure. For example:

The UE initiates a location update procedure, and sends an Update Request message to the target core management NE. The Update Request message sent by the target access NE to the target core management NE carries the CSG ID of the target access NE.

Note: The UE initiates a service request procedure, and sends a service request message to the target core management NE (namely, the core management NE accessed by the UE). The service request message sent by the target access NE (namely, the access NE accessed by the UE) carries the CSG ID of the target area (namely, the area accessed by the UE) to the target core management NE.

Note: An Initial UE Message sent by the target access NE carries the Update Request message to the target core management NE, and carries the CSG ID of the target access NE.

The Initial UE Message sent by the target access NE carries the service request message to the target core management NE, and carries the CSG ID of the target access NE.

The core management NE of the target network sends an Update Location message to the HSS according to the Update Request message.

After receiving the Update Location message, the HSS sends an Update Location Ack message to the core management NE of the target network, and the Update Location Ack message carries the Allowed CSG List of the UE.

Note: In the service request procedure, the target core management NE does not need to exchange messages with the HSS because the UE subscription information already exists in the target core management NE.

If no Allowed CSG List exists on the UE subscription information, the subscription information obtained by the target core management NE from the HSS includes no Allowed CSG List of the UE.

Note: The CSG ID of the target access NE in this embodiment may be a CSG ID of another target area (such as a target cell). In this case, the processing mode is the same except that the CSG ID of the target access NE is replaced with the CSG ID of another target area.

Scenario 2:

The NE of the source network implements access control during location area handover.

Depending on the network topology and the handover procedure, scenario 2 includes two modes.

Figure 5:
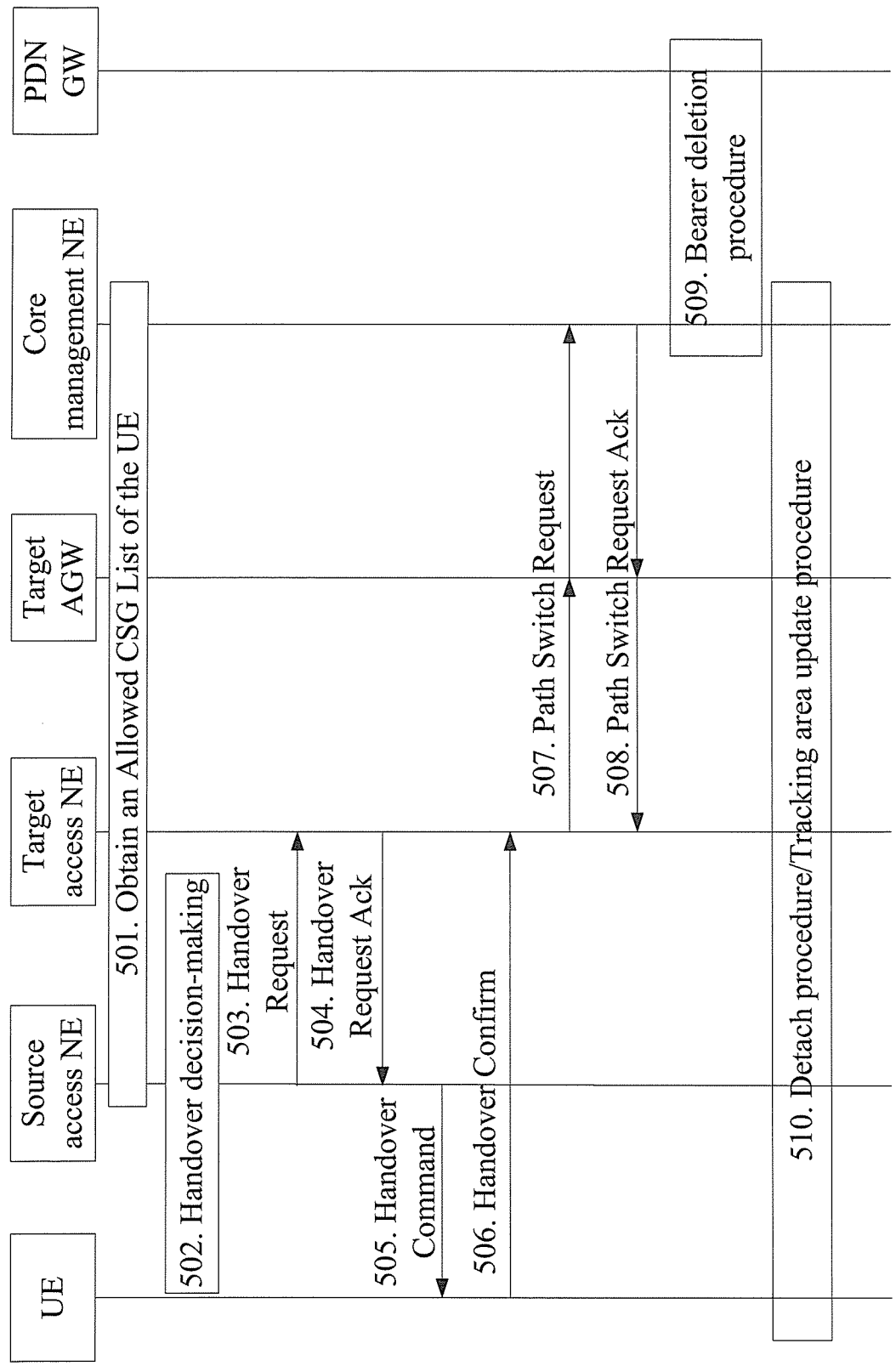
FIG. 5 shows mode 1 of scenario 2 of an access control method according to the second embodiment of the present invention.

Mode 1:

FIG. 5 illustrates the network structure and the method procedure of mode 1. The procedure includes the following steps:

Step 501: The source access NE obtains the Allowed CSG List of the UE. The source access NE may obtain the Allowed CSG List of the UE in the following way:

(1) When the UE accesses the core management NE, the core management NE sends the Allowed CSG List of the UE to the source access NE.

For example, in the access procedure, for an E-UTRAN, the MME sends an Initial Context Setup Request message that carries the Allowed CSG List of the UE to the source access NE; for a UTRAN, the SGSN sends an Information Transfer Indication message that carries the Allowed CSG List of the UE to the source access NE;

Or, (2) The HMS or the BAM system of the operator sends a message to the access NE. The Allowed CSG List of the UE is configured in the HMS or the BAM system (such as the OSS, BOSS or OMC) of the operator.

For example, after the access NE is powered on, the access NE sends a Register Request message to the HMS or the BAM system of the operator. The HMS or the BAM system of the operator returns a Register Response message that carries the Allowed CSG List of the UE to the access NE.

Note: If the subscription information of the UE includes no Allowed CSG List, the source access NE is unable to obtain the Allowed CSG List of the UE.

Step 502: The source access NE makes a handover decision. This step includes:

The source access NE decides whether to hand over the UE to the target access NE according to whether the CSG ID of the target access NE exists in the Allowed CSG List of the UE and/or whether an EMC service exists on the UE.

(1) If the CSG ID of the target access NE exists in the Allowed CSG List of the UE, the source access NE can initiate a handover procedure and the UE can be handed over to the target access NE.

(2) If an EMC service exists on the UE, the source access NE can initiate a handover procedure and the UE can be handed over to the target access NE.

(3) If no EMC service exists on the UE and no CSG ID of the target access NE exists in the Allowed CSG List of the UE, the source access NE is unable to select this target access NE to initiate a handover procedure.

Note: If the target area is a CSG area and no Allowed CSG List of the UE exists, the source access NE is unable to select this target area to initiate a handover procedure.

Or, if no EMC service exists on the UE, the target area is a CSG area and no Allowed CSG List of the UE exists, the source access NE is unable to select this target area to initiate a handover procedure.

The source access NE may select a target access NE for initiating the handover procedure according to the two conditions above in many ways, and it does not matter which of the two conditions is judged first. Preferably, this embodiment judges the two conditions in the following way:

The source access NE judges whether an EMC service exists on the UE first. If an EMC service exists on the UE, the source access NE selects this target access NE to initiate a handover procedure no matter whether the CSG ID of the target access NE exists in the Allowed CSG List of the UE (that is, the source access NE does not judge whether the CSG ID of the target access NE exists in the Allowed CSG List of the UE). If no EMC service exists on the UE, the source access NE judges whether the CSG ID of the target access NE exists in the Allowed CSG List of the UE, and selects this target access NE to initiate the handover procedure if the CSG ID of the target access NE exists in the Allowed CSG List of the UE, or cannot select this target access NE to initiate the handover procedure if the CSG ID of the target access NE does not exist in the Allowed CSG List of the UE.

The source access NE may judge whether the CSG ID of the target access NE exists in the Allowed CSG List of the UE first, and select this target access NE to initiate the handover procedure (that is, the source access NE does not judge whether an EMC service exists on the UE) if the CSG ID of the target access NE exists in the Allowed CSG List of the UE. If no CSG ID of the target access NE exists in the Allowed CSG List of the UE, the source access NE judges whether an EMC service exists on the UE, and selects this target access NE to initiate the handover procedure if an EMC service exists on the UE, or cannot select this target access NE to initiate the handover procedure if no EMC service exists on the UE.

Note: If the target area is a CSG area and no Allowed CSG List of the UE exists, the source access NE is unable to select this target area to initiate a handover procedure.

Or, if an EMC service exists on the UE, the source access NE can select a target area to initiate handover; if no EMC service exists on the UE, the target area is a CSG area, and no Allowed CSG List of the UE exists, the source access NE cannot select this target area to initiate a handover procedure.

The source access NE judges whether an EMC service exists on the UE in the same way as the core management NE judges whether the EMC service exists on the UE in step 372.

When the source access NE selects the target access NE to initiate a handover procedure, the following steps are included:

Step 503: The source access NE sends a Handover Request message to the target access NE.

Alternatively, if no CSG ID of the target access NE exists in the Allowed CSG List of the UE, and an EMC service exists on the UE, this message sent by the source access NE may carry only the information about the bearer used by the EMC service.

Note: Alternatively, if the target area is a CSG area, no Allowed CSG List of the UE exists, and an EMC service exists on the UE, this message sent by the source access NE may carry only the information about the bearer used by the EMC service.

The target access NE may be a home WAP (such as the HNB or HeNB or Home non-3GPP WAP), or a WAP with CSG functions (for example, the NodeB, or eNodeB, or non-3GPP WAP).

Step 504: The target access NE returns a Handover Request Ack message to the source access NE.

Step 505: The source access NE sends a Handover Command message to the UE, instructing the UE to be handed over to the target access NE.

Step 506: The UE is handed over to the target access NE, and sends a Handover Confirm message to the target access NE.

Step 507: The target access NE sends a Path Switch Request message to the core management NE.

The target access NE may add the CSG ID of the target access NE to this message. If the message sent by the source access NE to the target access NE in step 2 carries only the information about the bearer used by the EMC service, the message sent by the target access NE in this step carries only the information about the bearer used by the EMC service, for example, Tunnel End Point Identifier (TEID) of the access NE used by the bearer.

Note: If a target AGW exists, this message is sent to the core management NE through the target AGW.

Step 508: The core management NE returns a Path Switch Request Ack message to the target access NE.

Step 509: If the message sent by the target access NE in step 503 carries only the information about the bearer used by the EMC service, or if the core management NE determines that no CSG ID of the target access NE exists in the Allowed CSG List of the UE, and that an EMC service exists on the UE, the core management NE may initiate a bearer deletion procedure to delete the bearer used by the non-EMC service (that is, reserve only the bearer used by the EMC service). That is, if no CSG ID of the target access NE exists in the Allowed CSG List of the UE, only the bearer used by the EMC service is allowed to access the target access NE, and the bearers used by non-EMC services are not allowed to access the target access NE, thus maximally ensuring that the access control mechanism for the UE during handover is consistent with the CSG mechanism.

Note: If the target area is a CSG area, no Allowed CSG List of the UE exists in the core management NE, and an EMC service exists on the UE, the core management NE may initiate a bearer deletion procedure to delete the bearers used by non-EMC services (that is, reserve only the bearer used by the EMC service).

Note: The procedure for deleting the bearers used by non-EMC services may also be initiated by the source access NE. If the source access NE in step 502 determines that no CSG ID of the target access NE exists in the Allowed CSG List of the UE and that an EMC service exists on the UE, the source access NE instructs the core management NE to delete the bearers used by non-EMC services, and the core management NE initiates a bearer deletion procedure to delete the bearers used by non-EMC services. The source access NE may instruct the core management NE to delete the bears used by non-EMC services in step 502, or in 504 after a Handover Request Ack message is received.

Note: If the target area is a CSG area, no Allowed CSG List of the UE exists in the source access NE, and an EMC service exists on the UE, the source access NE instructs the core management NE to delete the bearers used by non-EMC services, and the core management NE initiates a bearer deletion procedure to delete the bearers used by non-EMC services.

Step 510: When the EMC service of the UE is terminated and no CSG ID of the target access NE exists in the Allowed CSG List of the UE, the UE or the core management NE initiates a detach procedure to detach the UE, or initiates an update procedure to migrate the UE from the target access NE to the accessible cell, as detailed in steps 38-49 above.

Note: When the EMC service of the UE is terminated, the target area is a CSG area, and no Allowed CSG List of the UE exists on the UE or the core management NE, the UE or the core management NE initiates a detach procedure to detach the UE, or initiates an update procedure to migrate the UE from the target area to the accessible cell, as detailed in steps 38-49 above.

Note: The CSG ID of the target access NE in this embodiment may be a CSG ID of another target area (such as a target cell). In this case, the processing mode is the same except that the CSG ID of the target access NE is replaced with the CSG ID of another target area.

Note: The mechanism described in this embodiment may be also applied to the source access-side gateway to make a handover decision. The processing method is the same as the foregoing steps except that the source access NE is replaced with the source access-side gateway. The source access-side gateway may be a home WAP GW (such as the HNB GW or HeNB GW or Home non-3GPP WAP GW).

In this embodiment, the source access NE obtains the Allowed CSG List of the UE and the CSG ID of the target access gateway, and decides whether to hand over the UE to the target access NE according to such information and/or according to whether an EMC service exists on the UE. If no CSG ID of the target access NE exists in the Allowed CSG List of the UE, and no EMC service exists on the UE, the source access NE does not select this target access NE to initiate the handover procedure, thus implementing access control under the CSG mechanism.

If no CSG ID of the target access NE exists in the Allowed CSG List of the UE, but an EMC service exists on the UE, the source access NE can select this target access NE to initiate the handover procedure, thus ensuring continuity of the EMC service when the UE moves to the coverage area of the target access NE and is handed over to the target access NE.

Figure 6:
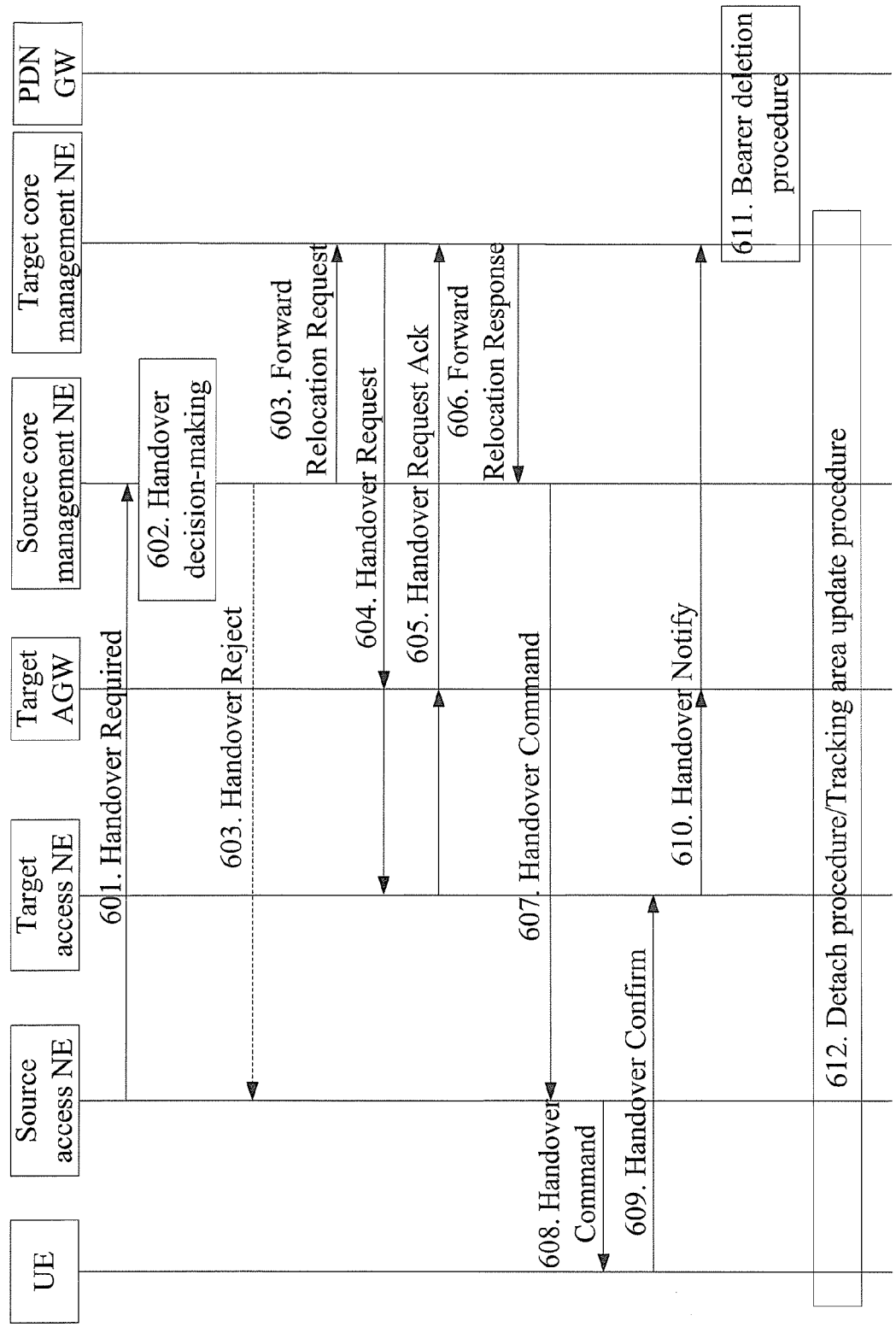
FIG. 6 shows mode 2 of scenario 2 of an access control method according to the second embodiment of the present invention.

Mode 2:

FIG. 6 illustrates a network structure and a method procedure in mode 2. In the network architecture shown in FIG. 6, the source access NE or source core management NE may make the handover decision. For the method of the source access NE making the handover decision, see mode 1 of scenario 2 in the second embodiment of the present invention.

The following describes the method of the source core management NE making the handover decision in the network architecture shown in FIG. 6. The method includes the following steps:

Step 601: The source access NE makes a handover decision, that is, decides to hand over the UE to a target access NE. The source access NE sends a Handover Required message to the source core management NE. Alternatively, this message sent by the source access NE carries the CSG ID of the target access NE, or carries the cell ID of the target access NE.

If no CSG ID of the target access NE exists in the Allowed CSG List of the UE, but an EMC service exists on the UE, the Handover Required message sent by the source access NE may carry an indication, indicating that the source core management NE only needs to send the information about the bearer used by the EMC service to the target core management NE. For example, the message carries a Bearer Setup List Information Element (IE), and this IE carries only the information about the bearer used by the EMC service.

Note: If the target area is a CSG area, and no Allowed CSG List of the UE exists in the source access NE, but an EMC service exists on the UE, the Handover Required message sent by the source access NE may carry an indication, indicating that the source core management NE only needs to send the information about the bearer used by the EMC service to the target core management NE. For example, the message carries a Bearer Setup List IE, and this IE carries only the information about the bearer used by the EMC service.

Step 602: The source core management NE makes a handover decision. This step includes:

Step 6021: The source core management NE obtains the CSG ID of the target access NE and the Allowed CSG List of the UE.

The source core management NE obtains the Allowed CSG List of the UE from the HSS.

The source core management NE may obtain the CSG ID of the target access NE in the following way:

receive a Handover Required message sent by the source access NE, where the message carries the CSG ID of the target access NE; or search a table of mapping relations between an ID of the target access NE and the CSG ID, and obtain the CSG ID of the target access NE according to the ID of the target access NE, where the table of mapping relations between an ID of the target access NE and the CSG ID is configured in the source core management NE, or the HMS, or the BAM system of the operator; or obtain the CSG ID of the target access NE according to the cell ID of the target access NE. The cell ID includes the CSG ID of the target access NE, and is reported to the source core management NE through the Handover Required message.

Note: If no Allowed CSG List of the UE exists on the UE subscription information, the source core management NE obtains no Allowed CSG List of the UE.

Step 6022: The source core management NE controls the access of the UE to the target access NE according to whether the CSG ID of the target access NE exists in the Allowed CSG List of the UE and/or whether an EMC service exists on the UE.

The source core management NE allows the UE to access the target access NE if an EMC service exists on the UE.

Or the source core management NE allows the UE to access the target access NE if the CSG ID of the target access NE exists in the Allowed CSG List of the UE.

Or the source core management NE rejects the access of the UE to the target access NE if at least one of the foregoing conditions is not fulfilled.

The source core management NE controls the access of the UE to the target access NE according to the two conditions above in many ways, and it does not matter which of the two conditions is judged first. Preferably, this embodiment judges the two conditions in the following way:

The source core management NE judges whether an EMC service exists on the UE first. If an EMC service exists on the UE, the source core management NE accepts the Handover Required message of the source access NE no matter whether the CSG ID of the target access NE exists in the Allowed CSG List of the UE (that is, the source core management NE does not judge whether the CSG ID of the target access NE exists in the Allowed CSG List of the UE). If no EMC service exists on the UE, the source core management NE judges whether the CSG ID of the target access NE exists in the Allowed CSG List of the UE, and accepts the Handover Required message of the source access NE if the CSG ID of the target access NE exists in the Allowed CSG List of the UE, or rejects the Handover Required message of the source access NE if no CSG ID of the target access NE exists in the Allowed CSG List of the UE.

The source core management NE may judge whether the CSG ID of the target access NE exists in the Allowed CSG List of the UE first, and accept the Handover Required message of the source access NE (that is, the source core management NE does not judge whether an EMC service exists on the UE) if the CSG ID of the target access NE exists in the Allowed CSG List of the UE. If no CSG ID of the target access NE exists in the Allowed CSG List of the UE, the source core management NE judges whether an EMC service exists on the UE, and accepts the Handover Required message of the source access NE if an EMC service exists on the UE, or rejects the Handover Required message of the source access NE if no EMC service exists on the UE.

Note: If no Allowed CSG List of the UE exists in the source core management NE, and the target area is a CSG area, the source core management NE rejects the Handover Required message of the source access NE.

Or, if an EMC service exists on the UE, the source core management NE accepts the Handover Required message of the source access NE; if no EMC service exists on the UE, no Allowed CSG List of the UE exists in the source core management NE, and the target area is a CSG area, the source core management NE rejects the Handover Required message of the source access NE.

Step 603: If the source core management NE rejects the Handover Required message of the source access NE, the source core management NE sends a Handover Reject message to the source access NE.

The Handover Reject message may carry an indication, indicating that the rejection is triggered by restricted CSG access (for example, the message carries a cause value "CSG Not Allowed"), or the Handover Reject message carries the Allowed CSG List of the UE, and therefore, the source access NE will not select this target access NE for handover subsequently.

Alternatively, if the source core management NE accepts the Handover Required message of the source access NE, or does not make the foregoing handover decision (but the source access NE makes the handover decision instead), step 603 may be:

The source core management NE sends a Forward Relocation Request message to the target core management NE.

If no CSG ID of the target access NE exists in the Allowed CSG List of the UE, and an EMC service exists on the UE, the Forward Relocation Request message may carry only the information about the bearer used by the EMC service.

Note: If the target area is a CSG area, no Allowed CSG List of the UE exists, but an EMC service exists on the UE, the Forward Relocation Request message may carry only the information about the bearer used by the EMC service.

When the UE registers with the source core management NE, the source core management NE may obtain the Allowed CSG List of the UE from the HSS. For example, the source core management NE sends an Update Location message to the HSS, and the HSS returns an Update Location Ack message that carries the Allowed CSG List of the UE to the source core management NE.

Note: If no Allowed CSG List exists on the UE subscription information, the subscription information obtained by the source core management NE from the HSS includes no Allowed CSG List of the UE.

Step 604: The target core management NE sends a Handover Request message to the target access NE.

The target access NE may be a home WAP (such as the HNB or HeNB or Home non-3GPP WAP), or a WAP with CSG functions (for example, the NodeB, or eNodeB, or non-3GPP WAP).

Step 605: The target access NE returns a Handover Request Ack message to the target core management NE. The target access NE may add the CSG ID of the target access NE to this message.

Note: If an AGW exists, the target access NE interacts with the target core management NE through the target AGW.

Step 606: The target core management NE returns a Forward Relocation Response message to the source core management NE.

Step 607: The source core management NE sends a Handover Command message to the source access NE.

Step 608: The source access NE sends a Handover Command message to the UE, instructing the UE to be handed over to the target access NE.

Step 609: The UE is handed over to the target access NE, and sends a Handover Confirm message to the target access NE.

Step 610: The target access NE sends a Handover Notify message to the target core management NE, indicating that the UE has been handed over to the target access NE.

Step 611: If the message sent by the target access NE in step 603 carries information about the bearer used by the EMC service, or, if the target core management NE determines that no CSG ID of the target access NE exists in the Allowed CSG List of the UE but an EMC service exists on the UE, the target core management NE may initiate a bearer deletion procedure to delete the bearers used by non-EMC services (that is, reserve only the bearer used by the EMC service).

Note: If the target area is a CSG area, no Allowed CSG List of the UE exists, and an EMC service exists on the UE, the target core management NE may initiate a bearer deletion procedure to delete the bearers used by non-EMC services (that is, reserve only the bearer used by the EMC service).

Note: The procedure for deleting the bearers used by non-EMC services may also be initiated by the source access NE. If the source access NE in step 601 determines that no CSG ID of the target access NE exists in the Allowed CSG List of the UE and that an EMC service exists on the UE, the source access NE instructs the source core management NE to delete the bearers used by non-EMC services, and the source core management NE initiates a bearer deletion procedure to delete the bearers used by non-EMC services. The source access NE may instruct the source core management NE to delete the bears used by non-EMC services in step 601, or in step 607 after the Handover Command message is received.

Note: If the target area is a CSG area, no Allowed CSG List of the UE exists, and an EMC service exists on the UE, the source access NE instructs the source core management NE to delete the bearers used by non-EMC services, and the source core management NE initiates a bearer deletion procedure to delete the bearers used by non-EMC services.

The procedure for deleting the bearers used by non-EMC services may also be initiated by the source core management NE. If the source core management NE in step 602 determines that no CSG ID of the target access NE exists in the Allowed CSG List of the UE but an EMC service exists on the UE, the source core management NE initiates a bearer deletion procedure to delete the bearers used by non-EMC services. The source core management NE may initiate the bearer deletion procedure to delete the bears used by non-EMC services in step 602, or in step 606 after a Forward Relocation Response message is received.

Note: If the target area is a CSG area, no Allowed CSG List of the UE exists, and an EMC service exists on the UE, the source core management NE initiates a bearer deletion procedure to delete the bearers used by non-EMC services.

Step 612: When the EMC service of the UE is terminated and no CSG ID of the target access NE exists in the Allowed CSG List of the UE, the UE or the target core management NE initiates a detach procedure to detach the UE, or initiates an update procedure to migrate the UE from the target access NE to the accessible cell.

Note: When the EMC service of the UE is terminated, the target area is a CSG area, and no Allowed CSG List of the UE exists, the UE or the target core management NE initiates a detach procedure to detach the UE, or initiates an update procedure to migrate the UE from the target area to the accessible cell.

In this embodiment, the NE of the source network obtains the Allowed CSG List of the UE and decides whether to hand over the UE to the target access NE according to such information and/or according to whether an EMC service exists on the UE.

If no CSG ID of the target access NE exists in the Allowed CSG List of the UE, and no EMC service exists on the UE, the source access NE does not select this target access NE to initiate a handover procedure or the source core management NE rejects the handover requirement of the source access NE, thus implementing access control under the CSG mechanism.

If no CSG ID of the target access NE exists in the Allowed CSG List of the UE, but an EMC service exists on the UE, the source access NE can select this target access NE to initiate the handover procedure or the source core management NE accepts the handover requirement of the source access NE, thus ensuring continuity of the EMC service when the UE moves to the coverage area of the target access NE and is handed over to the target access NE.

Note: The CSG ID of the target access NE in this embodiment may be a CSG ID of another target area (such as a target cell). In this case, the processing mode is the same except that the CSG ID of the target access NE is replaced with the CSG ID of another target area.

Scenario 3:

The target access NE implements access control during handover.

Depending on the network topology and the handover procedure, scenario 3 includes two modes.

Figure 13:
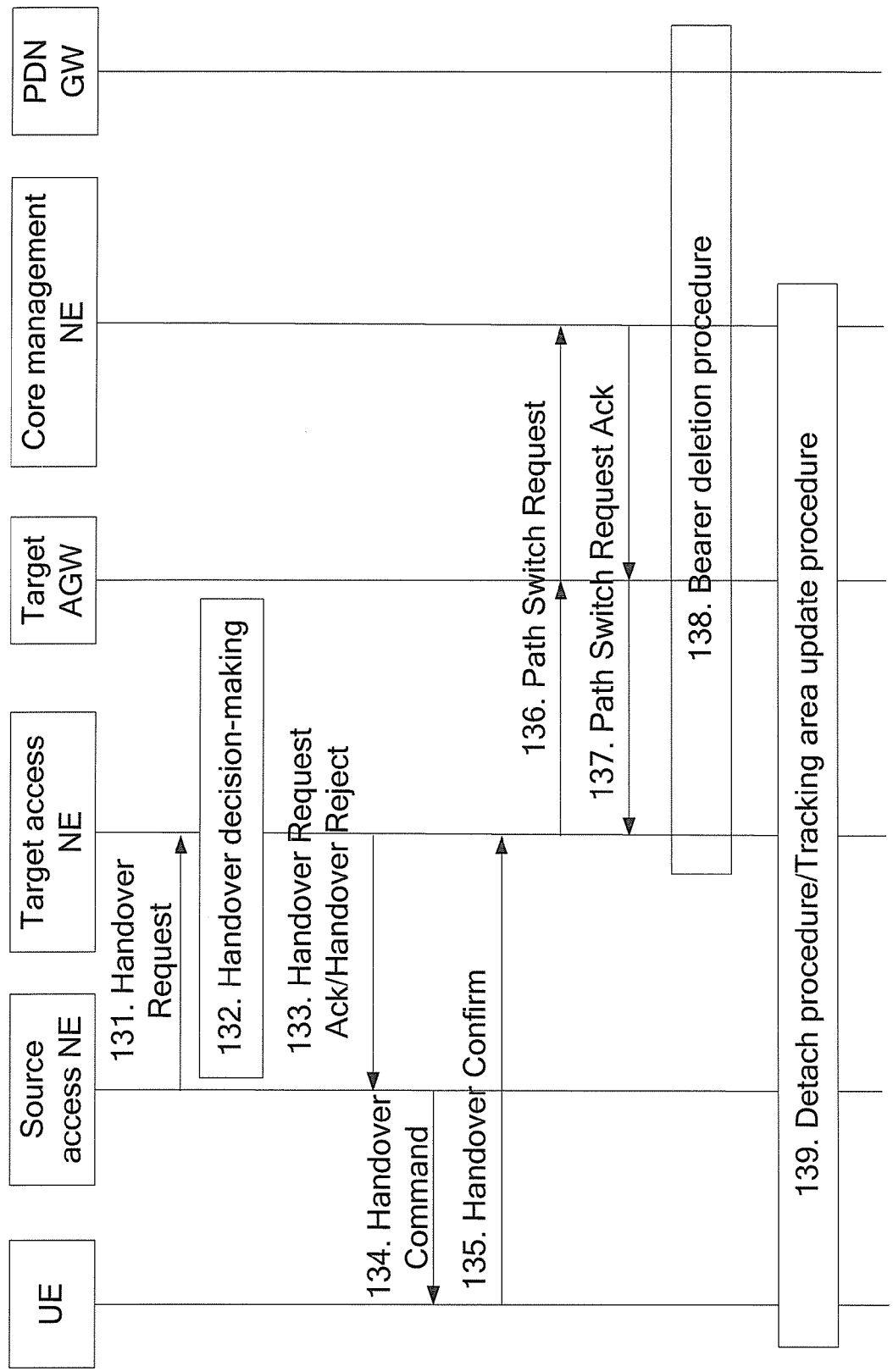
FIG. 13 shows mode 1 of scenario 3 of an access control method according to the second embodiment of the present invention.

Mode 1:

FIG. 13 illustrates the network structure and the method procedure of mode 1. The procedure includes the following steps:

Step 131: The source access NE makes a handover decision, that is, decides to hand over the UE to a target access NE. The source access NE sends a Handover Request message to the target access NE. Alternatively, the source access NE may add the CSG ID of the target area to the Handover Request message. The Handover Request message of the source access NE carries the Allowed CSG List of the UE.

Note: If no Allowed CSG List of the UE exists in the source access NE, the Handover Request message carries no Allowed CSG List of the UE.

Step 132: The target access NE makes a handover decision. This step includes:

Step 1321: The target access NE obtains the CSG ID of the target area and the Allowed CSG List of the UE.

The Allowed CSG List of the UE is sent by the source access NE to the target access NE.

The target access NE may obtain the CSG ID of the target area in at least one of the following ways:

(1) Receive a Handover Request message from the source access NE, where the Handover Request message carries the CSG ID of the target area.

(2) Search a table of mapping relations between an ID of the target area and the CSG ID, and obtain the CSG ID of the target area according to the ID of the target area, where the table of mapping relations between an ID of the target access NE and the CSG ID is configured in the target access NE, or obtained by the target access NE from the HMS or the BAM system of the operator.

(3) Obtain the CSG ID of the target area according to the cell ID of the target area. The cell ID includes the CSG ID of the target area, and is notified by the source access NE to the target access NE through a Handover Request message.

Note: If the source access NE does not notify the Allowed CSG List of the UE to the target access NE, the target access NE obtains no Allowed CSG List of the UE.

Step 1322: The target access NE controls the access of the UE to the target area according to whether the CSG ID of the target area exists in the Allowed CSG List of the UE and/or whether an EMC service exists on the UE.

(1) If the CSG ID of the target area exists in the Allowed CSG List of the UE, the target access NE accepts the Handover Request message, and the UE can be handed over to the target area.

(2) If an EMC service exists on the UE, the target access NE accepts the Handover Request message, and the UE can be handed over to the target area.

(3) If no EMC service exists on the UE and no CSG ID of the target area exists in the Allowed CSG List of the UE, the target access NE rejects the Handover Request message.

Note: If the target area is a CSG area and no Allowed CSG List of the UE exists, the target access NE rejects the Handover Request message.

Or if no EMC service exists on the UE, the target area is a CSG area, and no Allowed CSG List of the UE exists, the target access NE rejects the Handover Request message.

The target access NE makes the handover decision in the following way:

The target access NE judges whether an EMC service exists on the UE; and, if an EMC service exists on the UE, accepts the Handover Request message. If no EMC service exists on the UE, the target access NE judges whether the CSG ID of the target area exists in the Allowed CSG List of the UE, and accepts the Handover Request message if the CSG ID of the target area exists in the Allowed CSG List of the UE, or rejects the Handover Request message if no CSG ID of the target area exists in the Allowed CSG List of the UE.

Or, the target access NE judges whether the CSG ID of the target area exists in the Allowed CSG List of the UE, and, if the CSG ID of the target area exists in the Allowed CSG List of the UE, accepts the Handover Request message. If no CSG ID of the target area exists in the Allowed CSG List of the UE, the target access NE judges whether an EMC service exists on the UE, and accepts the Handover Request message if an EMC service exists on the UE, or rejects the Handover Request message if no EMC service exists on the UE.

Note: If the target area is a CSG area and no Allowed CSG List of the UE exists, the target access NE rejects the Handover Request message.

Or, if an EMC service exists on the UE, the target access NE accepts the Handover Request message; if no EMC service exists on the UE, no Allowed CSG List of the UE exists, and the target area is a CSG area, the target access NE rejects the Handover Request message.

The target access NE judges whether the CSG ID of the target area exists in the Allowed CSG List of the UE in the same way as the core management NE judges whether the CSG ID of the target area exists in the Allowed CSG List of the UE in step 372.

The target access NE judges whether an EMC service exists on the UE in the same way as the core management NE judges whether the EMC service exists on the UE in step 372.

Step 133: If the target access NE accepts the Handover Request message in step 132, the target access NE returns a Handover Request Ack message to the source access NE; if the target access NE rejects the Handover Request message in step 132, the target access NE returns a Handover Reject message to the source access NE. The Handover Reject message may carry an indication, indicating that the rejection is triggered by restricted CSG access (for example, the message carries a cause value "CSG Not Allowed"), and therefore, the source access NE will not select this target area for handover subsequently.

Step 134: If the source access NE receives a Handover Request Ack message in step 133, the source access NE sends a Handover Command message to the UE, instructing the UE to be handed over to the target access NE.

Step 135: The UE is handed over to the target access NE, and sends a Handover Confirm message to the target access NE.

Step 136: The target access NE sends a Path Switch Request message to the core management NE.

If a target AGW exists in the network, the Path Switch Request message is sent to the core management NE through the target AGW.

Alternatively, if no CSG ID of the target area exists in the Allowed CSG List of the UE, but an EMC service exists on the UE, the Path Switch Request message sent by the target access NE carries only the information about the bearer used by the EMC service.

Note: Alternatively, if the target area is a CSG area, no Allowed CSG List of the UE exists, but an EMC service exists on the UE, the Path Switch Request message sent by the target access NE carries only the information about the bearer used by the EMC service.

Step 137: The core management NE returns a Path Switch Request Ack message to the target access NE.

Alternatively, if no CSG ID of the target area exists in the Allowed CSG List of the UE, but an EMC service exists on the UE, step 138 is performed: The core management NE initiates a bearer deletion procedure to delete the bearers used by non-EMC services.

Or, the target access NE instructs the core management NE to initiate a bearer deletion procedure to delete the bearers used by non-EMC services. The target access NE may instruct the core management NE to initiate the bearer deletion procedure after receiving a Handover Confirm message in step 132 or step 135.

Note: Alternatively, if the target area is a CSG area, no Allowed CSG List of the UE exists, but an EMC service exists on the UE, step 138 is performed: The core management NE initiates a bearer deletion procedure to delete the bearers used by non-EMC services.

Or, the target access NE instructs the core management NE to initiate a bearer deletion procedure to delete the bearers used by non-EMC services. The target access NE may instruct the core management NE to initiate the bearer deletion procedure after receiving a Handover Confirm message in step 132 or step 135.

Further, if the UE is allowed to access the target access NE because an EMC service exists on the UE, after completion of the EMC service of the UE, step 139 is performed. Step 139 is the same as step 49.

Note: The mechanism described in this embodiment may be also applied to the target access-side gateway to make a handover decision. The processing method is the same as the foregoing steps except that the target access NE is replaced with the target access-side gateway. The target access-side gateway may be a home WAP GW (such as the HNB GW or HeNB GW or Home non-3GPP WAP GW).

Figure 14:
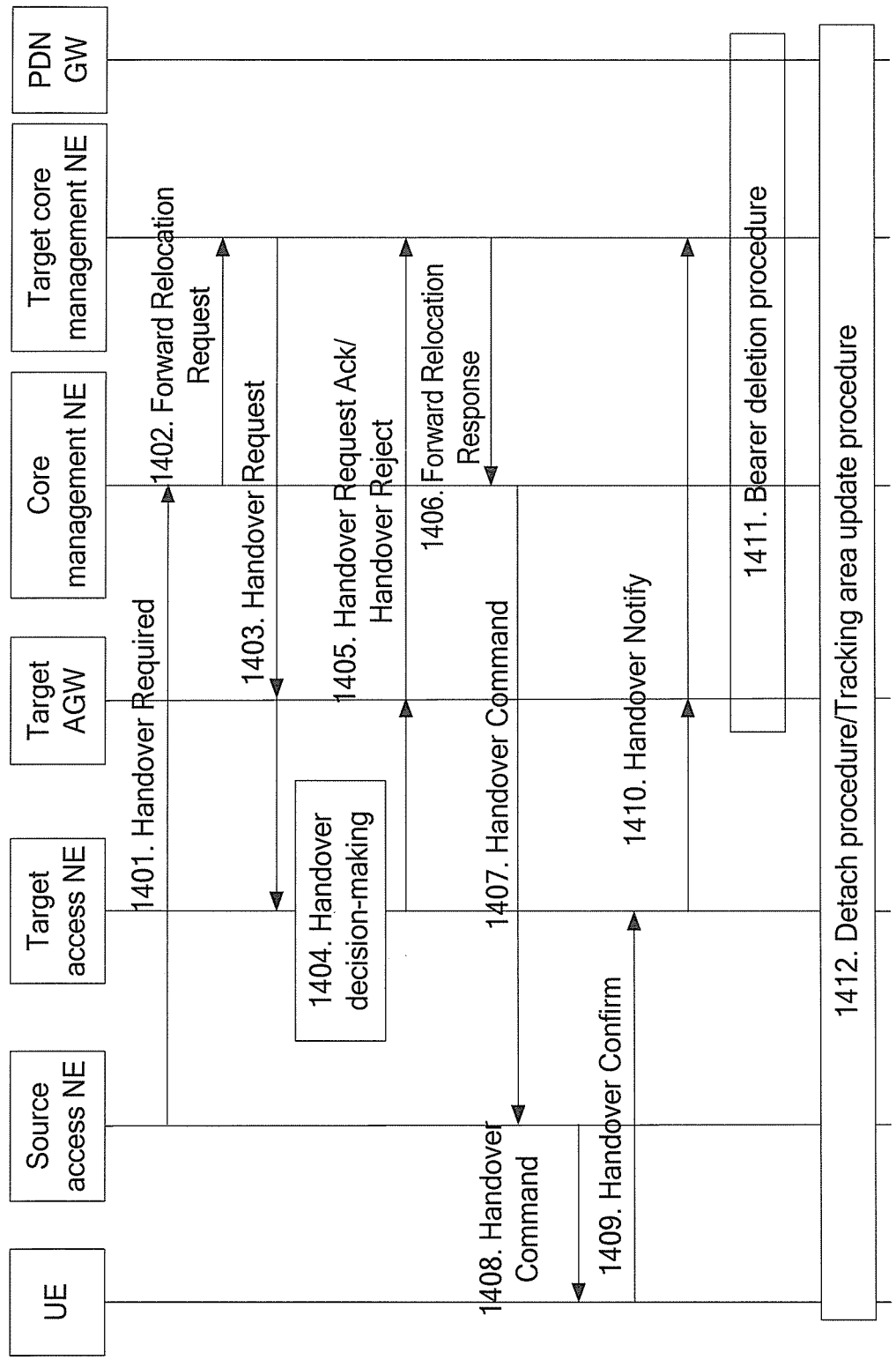
FIG. 14 shows mode 2 of scenario 3 of an access control method according to the second embodiment of the present invention.

Mode 2:

FIG. 14 illustrates the network structure and the method procedure of mode 2. The procedure includes the following steps:

Step 1401: The source access NE makes a handover decision, that is, decides to hand over the UE to a target access NE. The source access NE sends a Handover Required message to the source core management NE. Alternatively, the source access NE adds the CSG ID of the target area to this message.

Step 1402: The source core management NE sends a Forward Relocation Request message to the target core management NE. Alternatively, the source core management NE adds the CSG ID of the target area to this message.

Alternatively, the source core management NE adds the Allowed CSG List of the UE to this message.

Step 1403: The target core management NE sends a Handover Request message to the target access NE. Alternatively, the target core management NE adds the CSG ID of the target area to the Handover Request message. The Handover Request message of the target core management NE carries the Allowed CSG List of the UE.

Step 1404: The target access NE makes a handover decision. This step includes:

Step 14041: The target access NE obtains the CSG ID of the target area and the Allowed CSG List of the UE.

The Allowed CSG List of the UE is notified by the target core management NE to the target access NE.

Note: If no Allowed CSG List of the UE exists on the UE subscription information, the target AGW obtains no Allowed CSG List of the UE.

The target access NE may obtain the CSG ID of the target area in at least one of the following ways:

(1) Receive a Handover Request message from the target core management NE, where the Handover Request message carries the CSG ID of the target area.

(2) Search a table of mapping relations between an ID of the target area and the CSG ID, and obtain the CSG ID of the target area according to the ID of the target area, where the table of mapping relations between an ID of the target access NE and the CSG ID is configured in the target access NE, or obtained by the target access NE from the HMS or the BAM system of the operator.

(3) Obtain the CSG ID of the target area according to the cell ID of the target area. The cell ID includes the CSG ID of the target area, and is notified by the target core management NE to the target access NE through a Handover Request message.

Step 14042: The target access NE controls the access of the UE to the target area according to whether the CSG ID of the target area exists in the Allowed CSG List of the UE and/or whether an EMC service exists on the UE.

(1) If the CSG ID of the target area exists in the Allowed CSG List of the UE, the target access NE accepts the Handover Request message, and the UE can be handed over to the target area.

(2) If an EMC service exists on the UE, the target access NE accepts the Handover Request message, and the UE can be handed over to the target area.

(3) If no EMC service exists on the UE and no CSG ID of the target area exists in the Allowed CSG List of the UE, the target access NE rejects the Handover Request message.

Note: If the target area is a CSG area and no Allowed CSG List of the UE exists, the target access NE rejects the Handover Request message.

Or, if no EMC service exists on the UE, the target area is a CSG area, and no Allowed CSG List of the UE exists, the target access NE rejects the Handover Request message.

The target access NE makes the handover decision in the following way:

The target access NE judges whether an EMC service exists on the UE; and, if an EMC service exists on the UE, accepts the Handover Request message. If no EMC service exists on the UE, the target access NE judges whether the CSG ID of the target area exists in the Allowed CSG List of the UE, and accepts the Handover Request message if the CSG ID of the target area exists in the Allowed CSG List of the UE, or rejects the Handover Request message if no CSG ID of the target area exists in the Allowed CSG List of the UE. Or, The target access NE judges whether the CSG ID of the target area exists in the Allowed CSG List of the UE, and, if the CSG ID of the target area exists in the Allowed CSG List of the UE, accepts the Handover Request message. If no CSG ID of the target area exists in the Allowed CSG List of the UE, the target access NE judges whether an EMC service exists on the UE, and accepts the Handover Request message if an EMC service exists on the UE, or rejects the Handover Request message if no EMC service exists on the UE.

Note: If no Allowed CSG List of the UE exists and the target area is a CSG area, the target access NE rejects the Handover Request message.

Or, if an EMC service exists on the UE, the target access NE accepts the Handover Request message; if no EMC service exists on the UE, no Allowed CSG List of the UE exists, and the target area is a CSG area, the target access NE rejects the Handover Request message.

The target access NE judges whether the CSG ID of the target area exists in the Allowed CSG List of the UE in the same as the core management NE judges whether the CSG ID of the target area exists in the Allowed CSG List of the UE in step 372.

The target access NE judges whether an EMC service exists on the UE in the same way as the core management NE judges whether the EMC service exists on the UE in step 372.

Step 1405: If the target access NE accepts the Handover Request in step 1404, the target access NE returns a Handover Request Ack message to the target core management NE. If the target access NE rejects the Handover Request in step 1404, the target access NE returns a Handover Reject message to the target core management NE. The Handover Reject message may carry an indication, indicating that the rejection is triggered by restricted CSG access (for example, the message carries a cause value "CSG Not Allowed").

Step 1406: The target core management NE returns a Forward Relocation Response message to the source core management NE.

If the target core management NE receives a Handover Reject message in step 1405, the target core management NE sends a Forward Relocation Response message indicative of handover rejection to the source core management NE. The Forward Relocation Response message may carry an indication, indicating that the handover rejection is triggered by restricted CSG access, for example, the message carries a cause value "CSG Not Allowed".

Step 1407: If the target core management NE indicates handover success, the source core management NE sends a Handover Command message to the source access NE.

If the target core management NE indicates handover rejection, the source core management NE sends a Handover Reject message to the source access NE. The Handover Reject message may carry an indication, indicating that the handover rejection is triggered by restricted CSG access. For example, the message carries a cause value "CSG Not Allowed".

Step 1408: If the source access NE receives a Handover Command message, the source access NE sends the Handover Command message to the UE, instructing the UE to be handed over to the target access NE. If the Handover Reject message received by the source access NE carries an indication indicating that the handover rejection is triggered by restricted CSG access, the source access NE will not select this target access NE for initiating a handover procedure any longer subsequently.

Step 1409: If the target core management NE allows the UE to access the target management NE, the UE is handed over to the target access NE, and sends a Handover Confirm message to the target access NE.

Step 1410: The target access NE sends a Handover Notify message to the target core management NE, indicating that the UE has been handed over to the target access NE.

Alternatively, if no CSG ID of the target area exists in the Allowed CSG List of the UE, but an EMC service exists on the UE, step 1411 is performed: The core management NE initiates a bearer deletion procedure to delete the bearers used by non-EMC services.

Or, the target access NE instructs the target core management NE to initiate a bearer deletion procedure to delete the bearers used by non-EMC services. The target access NE may instruct the core management NE to initiate the bearer deletion procedure after receiving a Handover Confirm message in step 1404 or step 1409.

Note: Alternatively, if the target area is a CSG area, no Allowed CSG List of the UE exists, but an EMC service exists on the UE, step 1411 is performed: The core management NE initiates a bearer deletion procedure to delete the bearers used by non-EMC services. Or, the target access NE instructs the target core management NE to initiate a bearer deletion procedure to delete the bearers used by non-EMC services. The target access NE may instruct the core management NE to initiate the bearer deletion procedure after receiving a Handover Confirm message in step 1404 or step 1409.

Further, if the UE is allowed to access the target access NE because an EMC service exists on the UE, after completion of the EMC service of the UE, step 1412 is performed, which is similar to step 49 above.

In conclusion, the second embodiment of the present invention provides a mechanism for processing the EMC service, and such mechanism ensures continuity of the EMC service while implementing the access control under the CSG mechanism.

Figure 7:
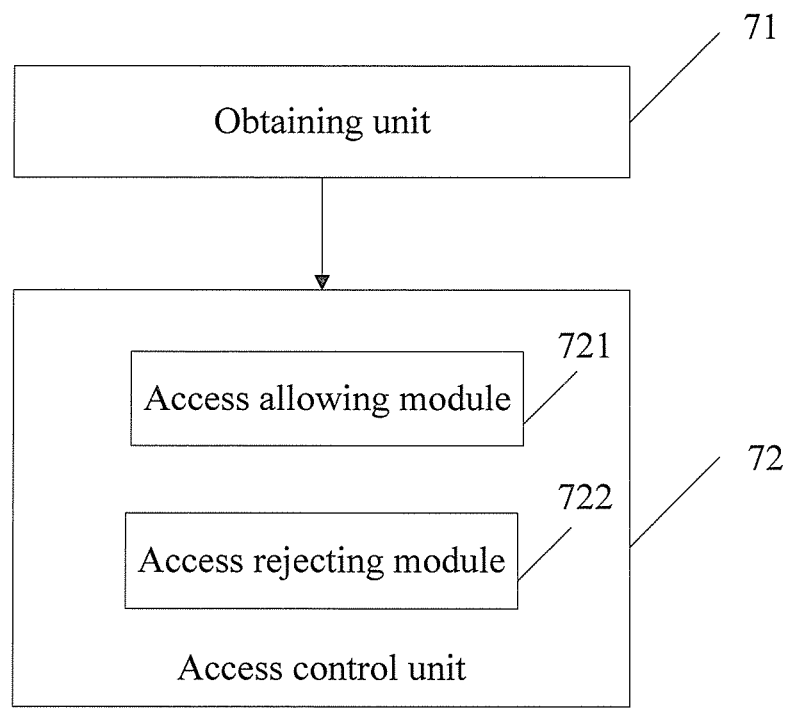
FIG. 7 shows a structure of an access control apparatus according to a third embodiment of the present invention.

An access control apparatus applied during location area handover is provided in the third embodiment of the present invention. As shown in FIG. 7, the access control apparatus includes:

an obtaining unit 71, configured to obtain a CSG ID of a target access NE and an Allowed CSG List of a UE; and an access control unit 72, configured to control the access of the UE to the target access NE according to whether the CSG ID of the target access NE exists in the Allowed CSG List of the UE and/or whether an EMC service exists on the UE.

The obtaining unit 71 obtains the CSG ID of the target access NE in many ways, depending on the network topology of the access control apparatus.

For example, in the network topology of the access control apparatus, if the source core management NE and the target core management NE are integrated in one NE, the obtaining unit 71 may obtain the CSG ID of the target access NE in the following way:

receive a Path Switch Request message from the target access NE, where the Path Switch Request message carries the CSG ID of the target access NE; or receive a Forward Relocation Request message from the core management NE of the source network, where the message carries the CSG ID of the target access NE; or receive a Handover Request Ack message from the target access NE, where the message carries the CSG ID of the target access NE; or search a table of mapping relations between an ID of the target access NE and the CSG ID, and obtain the CSG ID of the target access NE according to the ID of the target access NE, where the table of mapping relations between an ID of the target access NE and the CSG ID is configured in the core management NE of the target network, or the HMS, or the BAM system of the operator; or obtain the CSG ID of the target access NE according to the cell ID of the target access NE, where the cell ID includes the CSG ID of the target access NE, and is reported to the core management NE of the target network through a Path Switch Request message or a Forward Relocation Request message or a Handover Request Ack message.

For example, in the network topology of the access control apparatus, if the source core management NE and the target core management NE are configured in different NEs, the obtaining unit 71 may obtain the CSG ID of the target access NE in the following way:

receive a Handover Required message sent by the source access NE, where the message carries the CSG ID of the target access NE; or search a table of mapping relations between an ID of the target access NE and the CSG ID, and obtain the CSG ID of the target access NE according to the ID of the target access NE, where the table of mapping relations between an ID of the target access NE and the CSG ID is configured in the source core management NE, or the HMS, or the BAM system of the operator; or obtain the CSG ID of the target access NE according to the cell ID of the target access NE, where the cell ID includes the CSG ID of the target access NE, and is reported to the source core management NE through the Handover Required message.

The obtaining unit 71 may obtain the Allowed CSG List of the UE from the HSS. For example, the obtaining unit 71 sends an Update Location message to the HSS, and the HSS returns an Update Location Ack message that carries the Allowed CSG List of the UE to the obtaining unit 71.

The access control unit 72 includes:

an access allowing module 721, configured to allow the UE to access the target access NE if an EMC service exists on the UE and/or the CSG ID of the target access NE exists in the Allowed CSG List of the UE; and an access rejecting module 722, configured to reject the access of the UE to the target access NE if no EMC service exists on the UE and no CSG ID of the target access NE exists in the Allowed CSG List of the UE.

Depending on the mode of denial or rejection, the access rejecting module 722 includes:

a handover rejecting module, configured to reject the UE to be handed over the access to the target access NE. The handover rejecting module instructs the UE which has not accessed the target access NE not to access the target access NE if no EMC service exists on the UE and no CSG ID of the target access NE exists in the Allowed CSG List of the UE.

Alternatively, the access rejecting module 722 may reject access by allowing the UE to access the target access NE first. In this case, the access rejecting module 722 further includes a detaching module, which is configured to detach the UE which has accessed the target access NE; or an update instructing module, which is configured to instruct the UE to initiate a location update procedure and instruct the UE to select an accessible cell and initiate a location update procedure.

The detaching module sends a Detach Request message to the UE. The Detach Request message may carry an indication, indicating that the detach request is triggered by restricted CSG access. For example, the Detach Request message carries a cause value "CSG Not Allowed". This indication instructs the UE to initiate an attach procedure and register with a mobile network of the operator through the selected cell. If the Allowed CSG List of the UE includes the CSG ID of the target access NE, the UE deletes the CSG ID of the target access NE from the Allowed CSG List of the UE.

The indication carried in the Detach Request message ensures that the UE accesses a target access NE that allows access, after the UE is detached from a target access NE where access is rejected.

The update instructing module sends a Release Command message to the target access NE first. The Release Command message carries an indication, indicating that location update needs to be initiated because the access is restricted. For example, the Release Command message carries a cause value "Access Restricted LU Required". After receiving the indication, the UE selects an accessible cell, for example, a non-CSG cell such as a macro cell, or an accessible CSG cell (namely, the CSG cell corresponding to a CSG ID included in the Allowed CSG List, except the CSG ID of the target access NE), and then initiates a location update procedure.

Depending on the network topology, the foregoing apparatus may be an NE in the source network, for example, a source access NE or a source core management NE, or an NE in the target network, for example, a core management NE or a target core management NE.

For the detailed working method of each functional entity in the apparatus embodiment, see the method embodiment.

Another access control apparatus applied during location area handover is provided. As shown in FIG. 7, this access control apparatus includes:

an obtaining unit 71, configured to obtain that a target area is a CSG area and that no Allowed CSG List of a UE exists; and an access control unit 72, configured to control the access of the UE to the target area according to the facts that the target area is a CSG area and that no Allowed CSG List of the UE exists and/or according to whether an EMC service exists on the UE.

The access control unit 72 includes:

an access allowing module 721, configured to allow the UE to access the target area if the target area is a CSG area and no Allowed CSG List of the UE exists but an EMC service exists on the UE; and an access rejecting module 722, configured to reject the access of the UE to the target area if the target area is a CSG area, no Allowed CSG List of the UE exists, and no EMC service exists on the UE; or reject the access of the UE to the target area if the target area is a CSG area and no Allowed CSG List of the UE exists.

Depending on the mode of denial or rejection, the access rejecting module 722 includes a handover rejecting module, which is configured to reject the UE to be handed over to access the target access NE. The handover rejecting module instructs the UE which has not accessed the target access NE not to access the target access NE if no EMC service exists on the UE, the target area is a CSG area, and no Allowed CSG List of the UE exists; or if the target area is a CSG area and no Allowed CSG List of the UE exists.

Alternatively, the access rejecting module 722 may reject access by allowing the UE to access the target access NE first. In this case, the access rejecting module 722 further includes a detaching module, which is configured to detach the UE which has accessed the target access NE; or an update instructing module, which is configured to instruct the UE to initiate a location update procedure and instruct the UE to select an accessible cell and initiate a location update procedure.

The detaching module sends a Detach Request message to the UE. The Detach Request message may carry an indication, indicating that the detach request is triggered by restricted CSG access. For example, the Detach Request message carries a cause value "CSG Not Allowed". This indication instructs the UE to initiate an attach procedure and register with a mobile network of the operator through the selected cell. If the Allowed CSG List of the UE includes the CSG ID of the target access NE, the UE deletes the CSG ID of the target access NE from the Allowed CSG List of the UE.

In conclusion, the access control apparatus in the third embodiment of the present invention provides a mechanism for processing the EMC service, and such mechanism ensures continuity of the EMC service while implementing the access control under the CSG mechanism.

Figure 8:
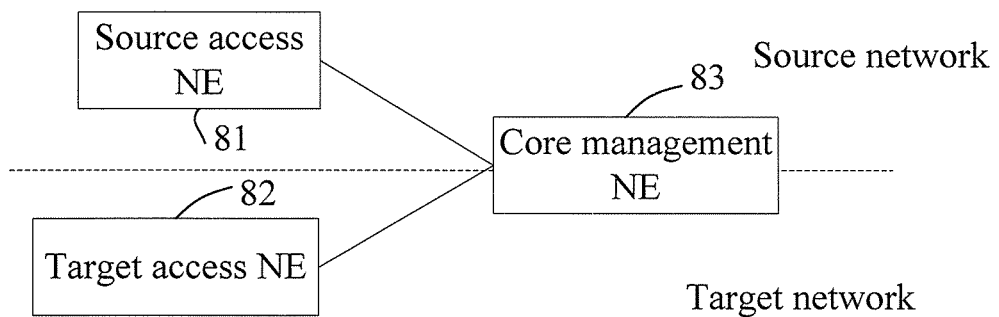
FIG. 8 is a first schematic diagram of a communication system according to a fourth embodiment of the present invention.

As shown in FIG. 8, a communication system provided in the fourth embodiment of the present invention includes a target access NE 82 and a core management NE 83 of a target network.

The target access NE 82 is configured to access the UE.

The core management NE 83 of the target network is configured to obtain a CSG ID of the target access NE 82 and the Allowed CSG List of the UE, and control the access of the UE to the target access NE 82 according to whether the CSG ID of the target access NE exists in the Allowed CSG List of the UE and/or whether an EMC service exists on the UE, or control the access of the UE to the target access NE 82 according to the facts that the target area is a CSG area and that no Allowed CSG List of the UE exists and/or according to whether an EMC service exists on the UE.

The core management NE 83 of the target network may obtain the CSG ID of the target access NE 82 in the following way:

receive a Path Switch Request message from the target access NE, where the Path Switch Request message carries the CSG ID of the target access NE; or receive a Forward Relocation Request message from the core management NE of the source network, where the message carries the CSG ID of the target access NE; or receive a Handover Request Ack message from the target access NE, where the message carries the CSG ID of the target access NE; or search a table of mapping relations between an ID of the target access NE and the CSG ID, and obtain the CSG ID of the target access NE according to the ID of the target access NE, where the table of mapping relations between an ID of the target access NE and the CSG ID is configured in the core management NE of the target network, or the HMS, or the BAM system of the operator; or obtain the CSG ID of the target access NE according to the cell ID of the target access NE, where the cell ID includes the CSG ID of the target access NE, and is reported to the core management NE of the target network through a Path Switch Request message or a Forward Relocation Request message or a Handover Request Ack message.

The core management NE 83 of the target network may obtain the Allowed CSG List of the UE from the HSS. For example, the core management NE 83 of the target network sends an Update Location message to the HSS, and the HSS returns an Update Location Ack message that carries the Allowed CSG List of the UE to the core management NE 83 of the target network.

In the communication system provided in the fourth embodiment, the core management NE of the target network judges whether the UE is allowed to access the target access NE. That is, the core management NE of the target network allows the UE to access the target access NE only if an EMC service exists on the UE or the CSG ID of the target access NE exists in the Allowed CSG List of the UE; or else, rejects the access of the UE to the target access NE.

That is, if the CSG ID of the target access NE does not exist in the Allowed CSG List of the UE, and no EMC service exists on the UE, the core management NE in the target network initiates a detach procedure to detach the UE, or instructs the UE to initiate an update procedure and migrate to the accessible cell. The detach procedure or update procedure ensures that the access control mechanism for the UE during handover is consistent with the CSG mechanism.

Alternatively, when the target core management NE controls the access of the UE to the target area according to the facts that the target area is a CSG area and that no Allowed CSG List of the UE exists and/or according to whether an EMC service exists on the UE, the control method includes: rejecting the access of the UE to the target area if the target area is a CSG area and no Allowed CSG List of the UE exists; or allowing the UE to access the target area if the target area is a CSG area and no Allowed CSG List of the UE exists but an EMC service exists on the UE; or rejecting the access of the UE to the target area if the target area is a CSG area, no Allowed CSG List of the UE exists, and no EMC service exists on the UE.

As shown in FIG. 8, the network topology of the foregoing communication system further includes a source access NE 81.

In the scenario in which the UE is handed over from the source access NE to the target access NE, the source access NE 81 is configured to send a Handover Request message to the target access NE 82.

The target access NE 82 is configured to send a Path Switch Request message that carries the CSG ID of the target access NE to the core management NE of the target network after receiving the Handover Request message.

Note: In this case, the source core management NE and the target core management NE are integrated in one NE. In the fourth embodiment of the present invention, the integrated core management NE 83 is configured to implement functions of the target core management NE.

Figure 9:
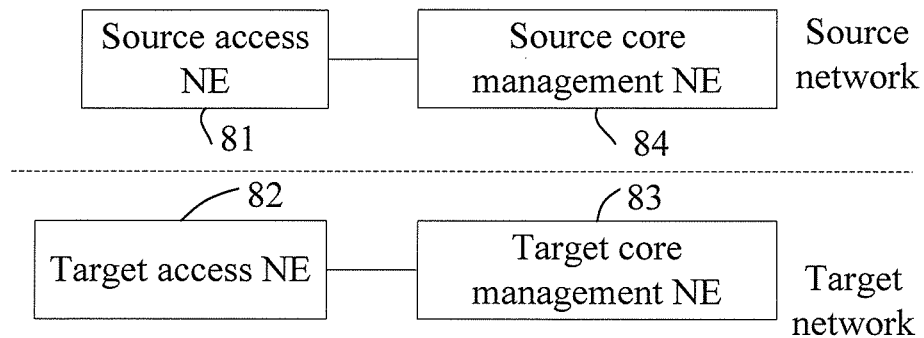
FIG. 9 is a second schematic diagram of a communication system according to the fourth embodiment of the present invention.

Alternatively, as shown in FIG. 9, in the scenario in which the UE is handed over from the source access NE 81 to the target access NE 82, the communication system further includes a source access NE 81 and a source core management NE 84. In this case, the source core management NE 84 and the target core management NE 83 are two different NEs located in the source network and the target network separately.

The source access NE 81 is configured to send a Handover Required message to the source core management NE 84, where the message carries the CSG ID of the target access NE.

The source core management NE 84 is configured to send a Forward Relocation Request message to the core management NE 83 of the target network according to the Handover Required message, where the Forward Relocation Request message carries the CSG ID of the target access NE.

When the UE is in a location update scenario, the target core management NE interacts with the HSS to obtain the Allowed CSG List of the UE, and then controls the access of the UE to the target access NE according to the access control method described above.

In conclusion, the communication system in the fourth embodiment of the present invention provides a mechanism for processing the EMC service, and such mechanism ensures continuity of the EMC service while implementing the access control under the CSG mechanism.

A communication system provided in the fifth embodiment of the present invention includes a source access NE 101 and a target access NE 102. The source access NE 101 judges whether the UE is allowed to access the target access NE 102. This embodiment deals with the scenario in which the UE is handed over from the source access NE 101 to the target access NE 102.

The target access NE 102 is configured to access the UE.

The source access NE 101 is configured to obtain the CSG ID of the target access NE 102 and the Allowed CSG List of the UE first; select the target access NE 102 to initiate a handover procedure if an EMC service exists on the UE or the CSG ID of the target access NE 102 exists in the Allowed CSG List of the UE; or select the target access NE 102 to initiate the handover procedure if obtaining that the target area is a CSG area and that no Allowed CSG List of the UE exists but an EMC service exists on the UE; or else give up selecting the target access NE to initiate the handover procedure.

The source access NE 101 obtains the CSG ID of the target access NE when the UE initiates the handover procedure. The source access NE 101 may obtain the Allowed CSG List information of the UE in the following way:

(1) When the UE accesses the core management NE, the core management NE sends the Allowed CSG List of the UE to the source access NE.

For example, in the access procedure, for an E-UTRAN network, the MME sends an Initial Context Setup Request message that carries the Allowed CSG List of the UE to the source access NE; for a UTRAN network, the SGSN sends an Information Transfer Indication message that carries the Allowed CSG List of the UE to the source access NE.

Or, (2) The HMS or the BAM system of the operator sends a message to the access NE. The Allowed CSG List of the UE is configured in the HMS or the BAM system (such as the OSS, BOSS or OMC) of the operator.

For example, after the access NE is powered on, the access NE sends a Register Request message to the HMS or the BAM system of the operator. The HMS or the BAM system of the operator returns a Register Response message that carries the Allowed CSG List of the UE to the access NE.

The communication system in the fifth embodiment of the present invention includes two types of topologies. In the first topology, the source core management NE and the target core management NE are integrated in the same NE; and in the second topology, the source core management NE and the target core management NE are two different network entities.

Figure 10:
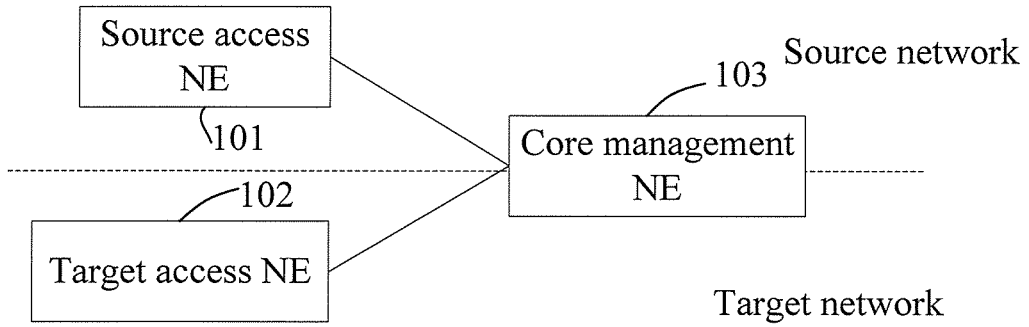
FIG. 10 is a first schematic diagram of a communication system according to a fifth embodiment of the present invention.

In the first topology, as shown in FIG. 10, the communication system includes an integrated core management NE 103. The integrated core management NE 103 primarily performs the functions of the source core management NE when the source access NE 101 obtains the Allowed CSG List of the UE; when the UE accesses the network, the integrated core management NE 103 primarily performs the functions of the target core management NE, and this core management NE or the HMS or the BAM system of the operator sends the Allowed CSG List of the UE to the source access NE.

Figure 11:
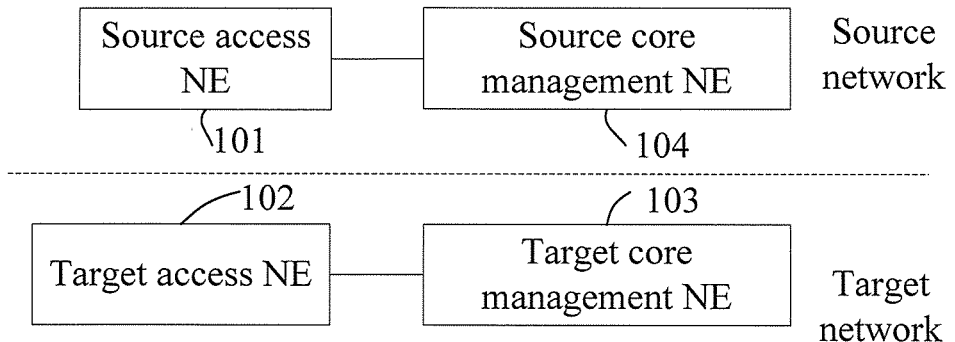
FIG. 11 is a second schematic diagram of a communication system according to the fifth embodiment of the present invention.

In the second topology, as shown in FIG. 11, the communication system includes a source core management NE 104 and a target core management NE 103 which are separated. When the source access NE 101 selects the target access NE 102 to initiate a handover procedure, the processing mechanism further includes:

The source access NE 101 sends a Handover Required message to the source core management NE 104, where the message carries only the information about the bearer used by the EMC service.

The source core management NE 104 sends a Forward Relocation Request message to the target core management NE 103 according to the Handover Required message, where the Forward Relocation Request message carries only the information about the bearer used by the EMC service.

The target core management NE 103 controls the target access NE to access the UE.

In conclusion, the communication system in the fifth embodiment of the present invention provides a mechanism for processing the EMC service, and such mechanism ensures continuity of the EMC service while implementing the access control under the CSG mechanism.

Figure 12:
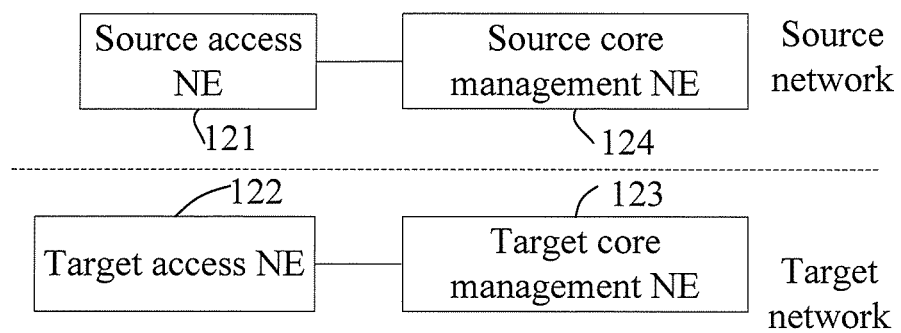
FIG. 12 is a schematic diagram of a communication system according to a sixth embodiment of the present invention.

As shown in FIG. 12, a communication system provided in the sixth embodiment of the present invention includes a target access NE 122 and a source core management NE 124.

The source core management NE 124 judges whether the UE is allowed to access the target access NE 122. The detailed processing method is as follows:

The target access NE 122 is configured to access the UE.

The source core management NE 124 is configured to allow the UE to access the target access NE 122 if an EMC service exists on the UE or the CSG ID of the target access NE 122 exists in the Allowed CSG List of the UE; or allow the UE to access the target access NE 122 if obtaining that the target area is a CSG area and that no Allowed CSG List of the UE exists but an EMC service exists on the UE; or else, reject the access of the UE to the target access NE 122.

That is, if no CSG ID of the target access NE 122 exists in the Allowed CSG List of the UE, or if the target area is a CSG area, no Allowed CSG List of the UE exists and no EMC service exists on the UE, the source core management NE 124 initiates a detach procedure to detach the UE, or instructs the UE to initiate an update procedure and migrate to the accessible cell. The detach procedure or update procedure ensures that the access control mechanism for the UE during handover is consistent with the CSG mechanism.

The source core management NE 124 obtains the Allowed CSG List of the UE from the HSS.

The source core management NE 124 may obtain the CSG ID of the target access NE in the following way:

receive a Handover Required message sent by the source access NE 121, where the message carries the CSG ID of the target access NE; or search a table of mapping relations between an ID of the target access NE 122 and the CSG ID, and obtain the CSG ID of the target access NE 122 according to the ID of the target access NE, where the table of mapping relations between an ID of the target access NE 122 and the CSG ID is configured in the source core management NE, or the HMS, or the BAM system of the operator; or obtain the CSG ID of the target access NE 122 according to the cell ID of the target access NE 122, where the cell ID includes the CSG ID of the target access NE 122, and is reported to the source core management NE 124 through the Handover Required message.

The communication system in the sixth embodiment of the present invention further includes a target core management NE 123. To keep consistent with the access control method under the CSG mechanism, when the source core management NE 124 allows the UE to access the target access NE, the target core management NE 123 receives a Forward Relocation Request message from the source core management NE 124, where the Forward Relocation Request message carries only the information about the bearer used by the EMC service.

In conclusion, the communication system in the sixth embodiment of the present invention provides a mechanism for processing the EMC service, and such mechanism ensures continuity of the EMC service while implementing the access control under the CSG mechanism.

A communication system provided in the seventh embodiment of the present invention includes a target access NE, which is configured to obtain a CSG ID of a target area and an Allowed CSG List of a UE, and control the access of the UE to the target area according to whether the CSG ID of the target area exists in the Allowed CSG List of the UE and/or whether an EMC service exists on the UE; or configured to obtain that the target area is a CSG area and that no Allowed CSG List of the UE exists, and control the access of the UE to the target area according to the facts that the target area is a CSG area and that no Allowed CSG List of the UE exists and/or according to whether an EMC service exists on the UE.

The communication system provided in the seventh embodiment comes in two network structures: One network structure is shown in FIG. 8, in which the source core management NE and the target core management NE are integrated in one NE; and the other network structure is shown in FIG. 9.

In the seventh embodiment, the target access NE may obtain the Allowed CSG List of the UE by receiving a Handover Request message from the source access NE. This Handover Request message carries the Allowed CSG List of the UE. In this case, the system further includes a source access NE, which is configured to send a Handover Request message that carries the Allowed CSG List of the UE to the target access NE.

The target access NE is further configured to obtain the Allowed CSG List of the UE by receiving a Handover Request message from the target core management NE. This Handover Request message carries the Allowed CSG List of the UE.

In this case, the system further includes:

a source core management NE, configured to send a Forward Relocation Request message to the target core management NE, where the Forward Relocation Request message carries the Allowed CSG List of the UE; and a target core management NE, configured to send a Handover Request message that carries the Allowed CSG List of the UE to the target access NE.

For the detailed working method of each functional entity in the system embodiment, see the method embodiment herein.

To sum up, the technical solution under the present invention uses whether an EMC service exists on the UE as a factor for access control, and provides a mechanism for processing the EMC service under the CSG mechanism; this processing mechanism exercises access control on the UE without interrupting the EMC service of the UE, thus ensuring continuity of the EMC service.

Persons of ordinary skill in the art may understand that all or part of the steps of the method according to the embodiments of the present invention may be implemented by a program instructing relevant hardware. The program may be stored in a computer readable storage medium.

The above descriptions are merely exemplary embodiments of the present invention, but not intended to limit the scope of the present invention. Any modifications, variations or replacement that can be easily derived by those skilled in the art should fall within the scope of the present invention. Therefore, the scope of the present invention is subject to the appended claims.

What is claimed is:

1. A communication system, comprising:
    a source mobility management entity (MME) configured to obtain a Closed Subscriber Group (CSG) identifier (ID) of a target area from a handover required message sent by a source access network element (NE) to the source MME during a handover procedure and an allowed CSG list of a user equipment (UE), reject access of the UE to the target area if the CSG ID of the target area does not exist in the allowed CSG list of the UE and no emergency call (EMC) service exists on the UE, and allow the UE to access the target area and delete bearers used by non-EMC services on the UE if the CSG ID of the target area does not exist in the allowed CSG list of the UE but the EMC service exists on the UE; and
    the source access NE configured to send the handover required message carrying the CSG ID of the target area to the source MME during the handover procedure.

2. The communication system according to claim 1, wherein the source MME is further configured to allow the UE to access the target area if the CSG ID of the target area exists in the allowed CSG list of the UE.

3. The communication system according to claim 1, wherein the target area comprises:
    a target cell, or a target tracking area, or a target routing area.

4. The communication system according to claim 1, wherein the communication system further comprises:
    a target access NE configured to access the UE.

5. A computer program product comprising a non-transitory computer-readable medium having program code recorded thereon, the program code comprising:
    program code to obtain a Closed Subscriber Group (CSG) identifier (ID) of a target area from a handover required message sent by a source access network element (NE) to a source mobility management entity (MME) during a handover procedure and an allowed CSG list of a user equipment (UE); and
    program code to control access of the UE to the target area according to whether the CSG ID of the target area exists in the allowed CSG list of the UE, wherein the program code to control access of the UE comprises:
        program code to reject the access of the UE to the target area if the CSG ID of the target area does not exist in the allowed CSG list of the UE and no emergency call (EMC) service exists on the UE, and
        program code to allow the UE to access the target area and delete bearers used by non-EMC services on the UE if the CSG ID of the target area does not exist in the allowed CSG list of the UE but the EMC service exists on the UE.

6. The computer program product according to claim 5, wherein the program code to control access of the UE further comprises program code to allow the UE to access the target area if the CSG ID of the target area exists in the allowed CSG list of the UE.

7. An access control apparatus, comprising:
    a memory; and
    at least one processor coupled to the memory and configured to:
        obtain a Closed Subscriber Group (CSG) identifier (ID) of a target area from a handover required message sent by a source access network element (NE) to a source mobility management entity (MME) during a handover procedure, and an allowed CSG list of a user equipment (UE);
        control access of the UE to the target area according to whether the CSG ID of the target area exists in the allowed CSG list of the UE;
        reject the access of the UE to the target area if the CSG ID of the target area does not exist in the allowed CSG list of the UE and no emergency call (EMC) service exists on the UE; and
        allow the UE to access the target area and delete bearers used by non-EMC services on the UE if the CSG ID of the target area does not exist in the allowed CSG list of the UE but the EMC service exists on the UE.

8. The access control apparatus according to claim 7, wherein the at least one processor is further configured to:
    allow the UE to access the target area if the CSG ID of the target area exists in the allowed CSG list of the UE.

* * * * *